United States Patent
Smirnov et al.

(10) Patent No.: US 11,803,949 B2
(45) Date of Patent: Oct. 31, 2023

(54) IMAGE FUSION ARCHITECTURE WITH MULTIMODE OPERATIONS

(71) Applicant: Apple Inc., Cupertino, CA (US)

(72) Inventors: Maxim Smirnov, Portland, OR (US); David R. Pope, Fremont, CA (US)

(73) Assignee: APPLE INC., Cupertino, CA (US)

( * ) Notice: Subject to any disclaimer, the term of this patent is extended or adjusted under 35 U.S.C. 154(b) by 13 days.

(21) Appl. No.: 16/987,210

(22) Filed: Aug. 6, 2020

(65) Prior Publication Data
US 2022/0044372 A1  Feb. 10, 2022

(51) Int. Cl.
*G06T 5/50* (2006.01)
*G06T 5/00* (2006.01)
*G06T 3/00* (2006.01)

(52) U.S. Cl.
CPC ............. *G06T 5/50* (2013.01); *G06T 3/0093* (2013.01); *G06T 5/002* (2013.01)

(58) Field of Classification Search
CPC ......... G06T 3/0093; G06T 5/002; G06T 5/50; G06T 7/246; G06V 20/46; G06V 10/44; G06V 30/1801; G06V 30/18105; G06V 30/182; G06V 30/1823; G06V 30/1826; G06V 30/1829; G06V 30/1831; G06V 30/1834; G06V 30/1837; G06V 10/56; G06V 20/41; G06K 9/00; G06N 3/0454; G06N 3/08; G11B 27/031; G11B 27/34
See application file for complete search history.

(56) References Cited

U.S. PATENT DOCUMENTS

| | | | |
|---|---|---|---|
| 8,570,396 B2 | 10/2013 | Rapaport | |
| 8,873,883 B2 | 10/2014 | Zhang et al. | |
| 10,818,083 B1* | 10/2020 | Baskinger | G06T 17/005 |
| 2017/0213330 A1* | 7/2017 | Pudipeddi | G06T 5/50 |
| 2018/0068473 A1 | 3/2018 | Tico et al. | |
| 2018/0198970 A1* | 7/2018 | Seshadrinathan | H04N 5/247 |
| 2020/0118245 A1* | 4/2020 | Gao | G06T 7/0002 |
| 2020/0278929 A1* | 9/2020 | Ito | G06F 12/0875 |
| 2021/0049427 A1* | 2/2021 | Goto | H04N 5/23245 |
| 2021/0158496 A1* | 5/2021 | Bouchard | H04N 5/23229 |

FOREIGN PATENT DOCUMENTS

WO  WO 2018/136373 A1  7/2018

* cited by examiner

*Primary Examiner* — Amandeep Saini
*Assistant Examiner* — Denise G Alfonso
(74) *Attorney, Agent, or Firm* — Sterne, Kessler, Goldstein & Fox P.L.L.C.

(57) ABSTRACT

Embodiments relate to circuitry for temporal processing and image fusion. An image fusion circuit receives captured images, and generates corresponding image pyramids. The generated image pyramids are raster or tiled processed, and stored in memory. A fusion module receives a first and second image pyramids from the memory, and warps and fuses image pyramids to generate a fused image pyramid, which may be used for further processing, and may also be stored back into the memory. The image fusion circuitry is configurable to operate in a plurality of different configuration modes corresponding to different image fusion applications for fusing image pyramids of received images, including two-frame fusion, temporal filtering, infinite impulse response (IIR) temporal processing, and/or finite impulse response (FIR) temporal processing.

16 Claims, 14 Drawing Sheets

IMAGE FUSION ARCHITECTURE WITH MULTIMODE OPERATIONS

BACKGROUND

1. Field of the Disclosure

The present disclosure relates to a circuit for processing images and more specifically to fusion of different images.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

SUMMARY

Embodiments relate to circuitry for temporal processing and fusion of images. An image fusion circuit receives captured images, and generates image pyramids corresponding to the received images. The generated image pyramids are processed, and stored in memory in raster or tiled format. A fusion module receives a first image pyramid and a second image pyramid from the memory, and warps the second image pyramid based upon one or more warping parameters determined based upon registration of a first image associated with the first image pyramid to a second image associated with the second image pyramid. After warping, the warped second image pyramid better aligns with the first image pyramid than the original second image pyramid did. The fusion module fuses the first image pyramid with the warped second image pyramid to generate a fused image pyramid. The fused image pyramid may be used for further processing, and may also be stored back into the memory. By configuring the image fusion circuitry to generate pyramids of received images prior to warping and fusion, and by allowing fused image pyramids to be stored back into memory, the image fusion circuitry can be configured to implement a variety of temporal processing functions involving different combinations of image fusion.

Figure 1:
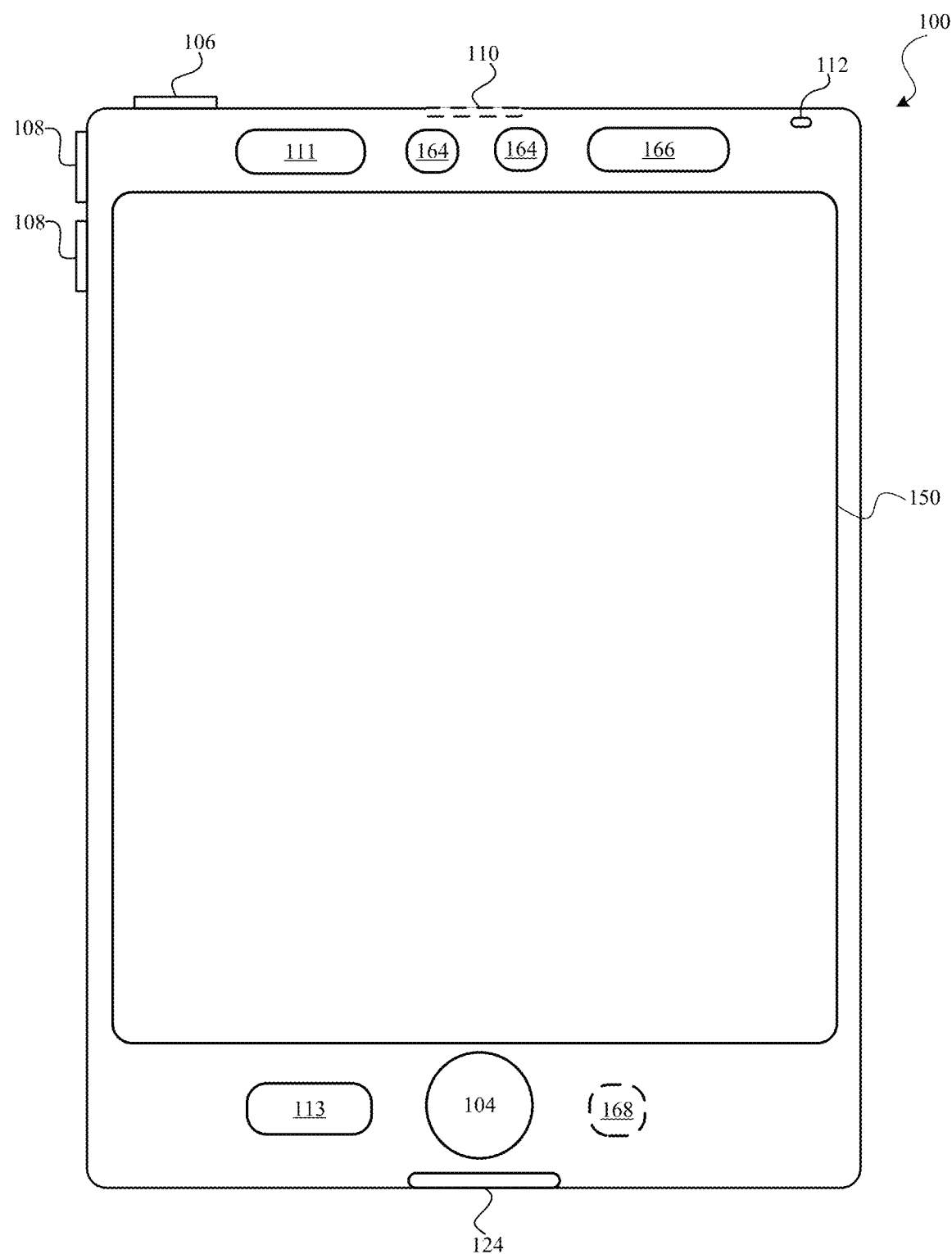
FIG. 1 is a high-level diagram of an electronic device, according to one embodiment

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to circuitry for performing temporal processing and fusion of images. Different images having different exposure times are fused to generate a fused image having a higher dynamic range than that of the captured images. Image fusion may also be used to perform temporal filtering where newly-received images are fused with a history image representing a fusion of one or more previously received images, or some combination thereof. To fuse the images, a model describing correspondence between the first image and a second image is built by processing at least the information about keypoints extracted from the images to be fused. Such modes may be used to warp the second image to better align the first and the second images. Temporal processing of received images may be performed followed by subsequent spatial processing. The spatial processing may use pixel confidence information from fusion thus better adapting spatial processing strength to fusion history. Also, different types of temporal processing functions, including but not limited to, two-frame fusion, temporal filtering, infinite impulse response (IIR) temporal processing and finite impulse response (FIR) temporal processing may also be performed.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
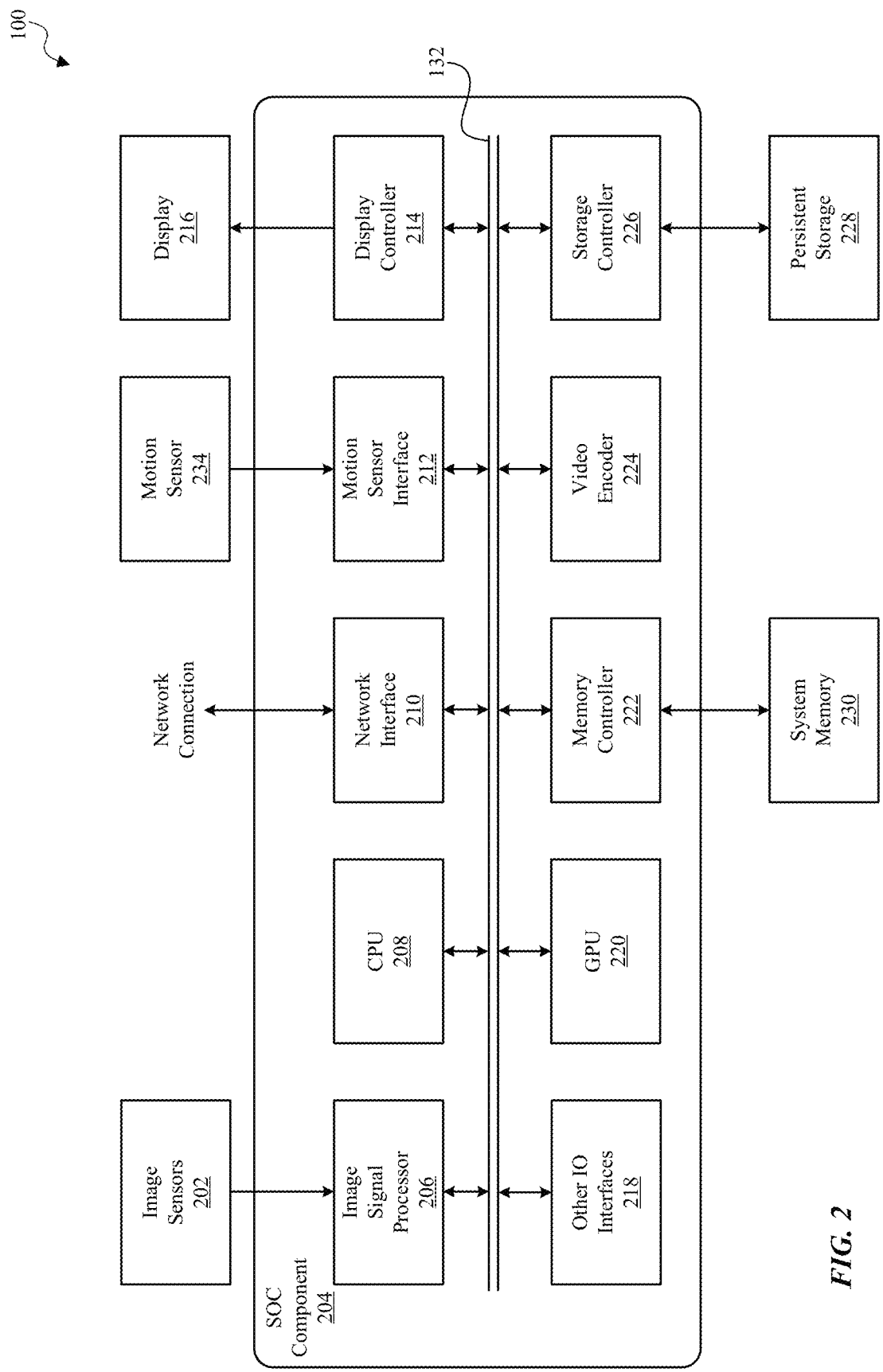
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). An image sensor 202 may also include optical and mechanical components that assist image sensing components (e.g., pixels) to capture images. The optical and mechanical components may include an aperture, a lens system, and an actuator that controls the lens position of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
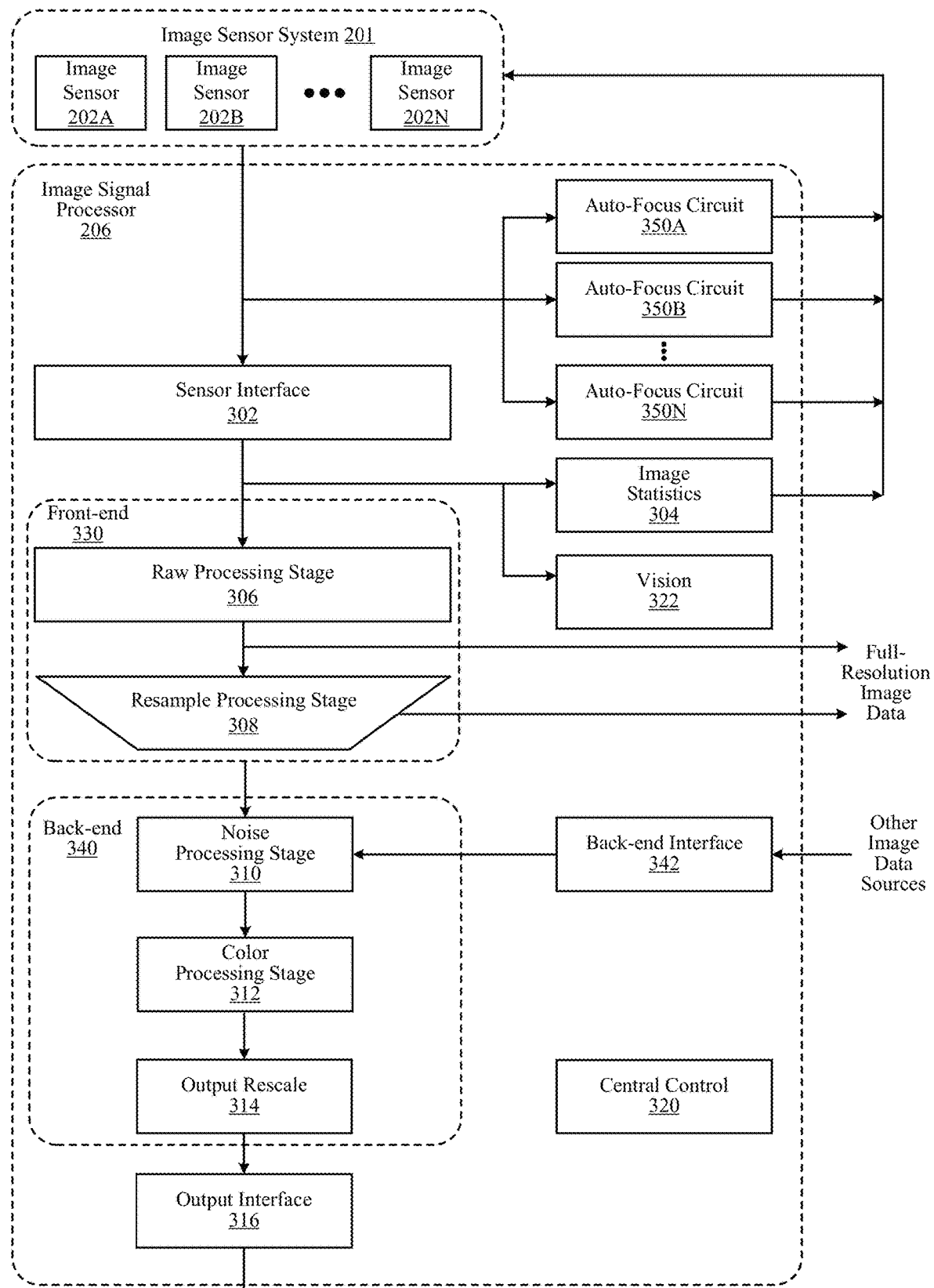
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may be share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include hardware circuit that analyzes raw image data to determine an appropriate lens position of each image sensor 202. In one embodiment, the raw image data may include data that is transmitted from image sensing pixels that specializes in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end 330 and back-end 340. This allows the ISP 206 to perform auto-focusing analysis independent of other image processing pipelines. For example, the ISP 206 may analyze raw image data from the image sensor 202A to adjust the lens position of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamless transition from image data captured by one image sensor 202 to image data captured by another image sensor without waiting for the second image sensor 202 to adjust its lens position because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (e.g., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered.

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Pipelines for Image Fusion

Figure 4:
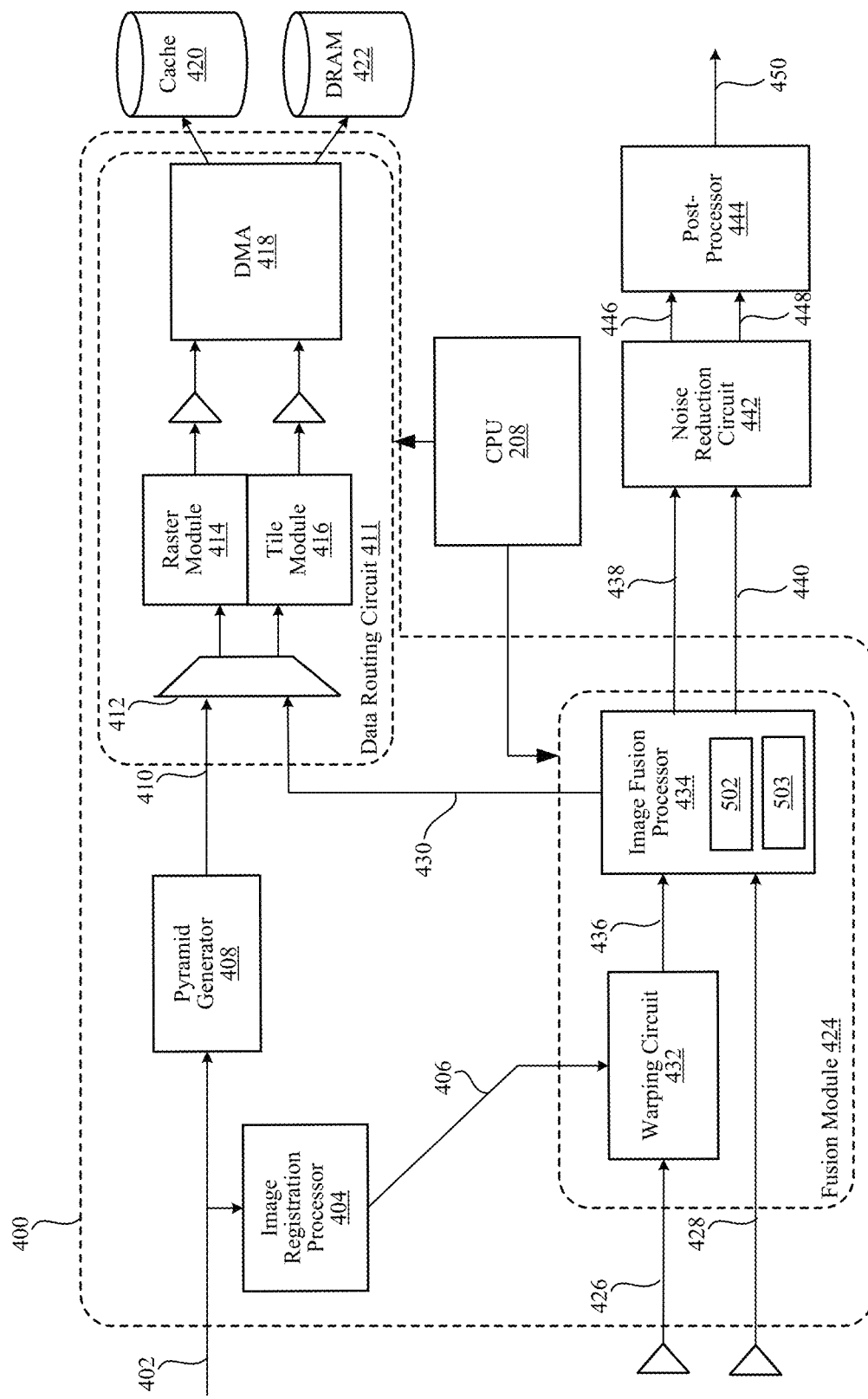
FIG. 4 is a block diagram illustrating a portion of the image processing pipeline including circuitry for image fusion, according to one embodiment.

FIG. 4 is a block diagram illustrating a portion of the image processing pipeline including circuitry for image fusion, according to one embodiment. The image fusion circuit 400 may be implemented as part of the vision module 322, front-end 330, and/or back-end 340 illustrated in FIG. 3. For example, in some embodiments, the vision module 322 is used to perform feature extraction from received images (e.g., based on keypoints of the received images), while pyramid generation may be performed at the front-end 330 (e.g., resample processing stage 308), and image fusion and noise reduction may be performed at the back-end 340 (e.g., noise processing stage 310). The image fusion circuit 400 implements a plurality of different types of fusion schemes, including bypass (e.g., no fusion), two-frame fusion (including but not limited to generation of HDR images), temporal filtering such as infinite impulse response (IIR) or finite impulse response (FIR), and/or the like. The controller 208 is coupled to the image fusion circuit 400 and configures the components of the image fusion circuit 400 to perform different operations based on the desired mode, described in greater detail below. The processing performed by the image fusion circuit 400 on received images may be referred to as "temporal processing." The temporally processed images may then be received by a spatial noise reduction circuit and/or post-processor circuit for performing "spatial processing" of the image. As such, the image fusion circuit 400, in conjunction with the noise reduction circuit 442 and post-processor 444 illustrated in FIG. 4, is used to perform "temporal-then-spatial" processing on received images.

The image fusion circuit 400 receives a plurality of images 402 captured by the image sensor system 201. In some embodiments, the images 402 include a plurality of sequentially captured images, while in other embodiments, the images 402 may correspond to sets of images captured concurrently using different image sensors 202 (e.g., first and second images captured at the same time using different sensors with different exposure times). Each of the images 402 may include multiple color components, e.g., luma and chroma color components.

In some embodiments, the images 402 are received by the image registration processor 404. The image registration processor 404 is hardware or combination of hardware and software that extracts features from an image of the received images 402, and match the extracted features with those of another image (e.g., another image of the received images 402, an image corresponding to a history frame, etc.) in order to determine a set of warping parameters between the different images. The extracted features correspond to distinguishable features within the image (also referred to as "salient points") and may be stored as a set of keypoints for the image. In some embodiments, each keypoint is associated spatial locations (e.g., coordinates) of at least a subset of pixels in the image frame. In addition, the image registration processor 404 may extract and encode keypoint descriptors for the set of extracted keypoints, which may include keypoint scale and orientation information.

In some embodiments, the image registration processor 404 further maps the set of keypoints extracted from the received image to a set of keypoints extracted from another image (e.g., a previously captured image, a concurrently captured image, a history image frame, etc.). Mapping can be performed, for example, by building a model describing correspondence between the keypoints of the different images, and searching for correspondences between the sets of keypoints to generate at least one motion vector representing relative movement between in portions of the images. In one embodiment, the image registration processor 404 correlates (matches) the keypoint information of the images, e.g., by comparing and pairing keypoint descriptors extracted from the images to determine a set of keypoint information matches, such as pairs of keypoint descriptors extracted from the images. The image registration processor 404 may then perform a model fitting algorithm by processing the determined set of keypoint information matches to build the model. The model fitting algorithm may be designed to discard false matches during the model building process. In some embodiments, the model fitting algorithm may be based on, e.g., the iterative random sample consensus (RANSAC) algorithm. The model built by the image registration processor 404 may include information about mapping between pixels in the images. The model may represent a linear transformation (e.g., affine or perspective transformation). Alternatively, the model may describe a non-linear transformation. Based on the model, warping parameters (mapping information) 406 are be generated by the image registration processor 404 and sent to warping circuit 432 for spatial transformation of at least one of the images. In some embodiments, warping parameters 406 can be used in a form of a matrix for spatial transformation (e.g., warping) of at least one of the images. The matrix for spatial transformation represents a geometric transformation matrix or a mesh grid with motion vectors defined for every grid point.

The image registration processor 404, to generate warping parameters between two images, may generate a set of keypoints for only the first image, and generates a motion vector for each of the keypoints of the first image. This is done by performing, e.g., the NCC search within an expected and configurable displacement range to determine a best feature match within a defined spatial vicinity (patch) of each keypoint of the first image. In such case, image registration processor 404 performs a model fitting algorithm (e.g., the RANSAC algorithm) that uses first keypoint information (e.g., coordinates of the keypoints of the first image) and corresponding motion vectors determined based on feature matches to build a model. The model fitting algorithm may be designed to discard false feature matches. Based on the built model, image registration processor 404 generates warping parameters (mapping information) 406 that is sent to warping circuit 432 for spatial transformation of the first image.

The received images 402 are also received by a pyramid generator circuit 408. The pyramid generator circuit 408 generates, for a received image 402, multiple downscaled images (also referred to as levels, scales, or octaves) each having a different resolution by sequentially downscaling the received image. Each downscaled image includes the multiple color components (e.g., Y, Cr, Cb color components). In addition, the pyramid includes an unscaled single color version (e.g., Y luma component only) of the image 402. As such, the generated pyramid 410 may include a plurality of stages 0 through n (e.g., 7 stages, corresponding to stages 0 through 6), where stage 0 corresponds to the unscaled single color image (e.g., Y component only), while stages 1 through n correspond to sequentially downscaled images with multiple color components (e.g., YCrCb), and the value of n (e.g., 6) corresponds to a number of downscaled levels. In some embodiments, each sequential stage of downscaling corresponds to downscaling each of the width and height by a factor of 2 relative to a previous stage. The generated pyramid 410 thus comprises low frequency components of the downscaled warped images and a low frequency component of an unscaled single color version (e.g., luma component) of the received image 402. The image pyramid 410 may be stored in memory, warped based upon a set of warping parameters determined for the corresponding image 402, fused with another image pyramid, etc.

In some embodiments, the generated image pyramid 410 output by the pyramid generator 408 is stored in memory in preparation for warping and/or fusion. For example, in applications where two captured images are to be fused (e.g., concurrently captured long exposure image frame and short exposure image frame, or two sequentially captured images), the pyramid generator 408 may generate a pyramid for the first of the two images, and store the generated image pyramid in memory while an image pyramid for the second image is being generated. In some embodiments, portions of the image pyramid 410 are stored in a cache that functions as a buffer before being transmitted to the fusion module 424, bypassing the memory (e.g., DRAM 422). How the generated pyramid 410 is stored may be determined using a data routing circuit 411 coupled to the pyramid generator 408. The data routing circuit 411 may comprise the multiplexor 412, raster module 414, tile module 416, and DMA 418 illustrated in FIG. 4.

The generated image pyramid 410 can be stored in either raster form, or in tile form. In some embodiments, the image pyramid 410 is received by a multiplexor (MUX) 412 configured to transmit the generated image pyramid 410 to a raster module 414 or to a tile module 416 in preparation for storage, based upon whether the image pyramid 410 is to be warped as part of an image fusion process. For example, if the generated image pyramid 410 is to be warped, the MUX 412 transmits the image pyramid 410 to the tile module 416 to be converted into a tile format for storage. On the other hand, if the generated image pyramid 410 does not need to be warped, the image pyramid 410 is sent through the raster module 414. In some embodiments, the pyramid generator 408 is configured to output the image pyramid 410 already in raster form. As such, the raster module 414 may simply be bypass circuit, allowing the image pyramid 410 to be stored to memory.

In some embodiments, the raster and/or tile modules 414 and 416 output the image pyramid to direct memory access (DMA) 418, which may store the image pyramid 410 (in raster or tile format) within persistent memory (e.g., DRAM 422) or within a cache (e.g., cache 420) that bypasses the memory. In some embodiments, if only a portion of the image pyramid 410 is to be stored (e.g., the image pyramid is to be immediately used for image fusion, such that only a portion of the pyramid needs to be stored at a time), then the DMA 418 may store the image pyramid 410 using cache 420, which acts as a buffer between the pyramid generator 408 and the fusion module 424. On the other hand, if the entire image pyramid is to be stored, and/or stored for a length of time, then the image pyramid 410 is stored in the DRAM 422. In some embodiments, the DRAM 422 is used to a store previously processed image pyramid (e.g., a history image pyramid) to be fused with image pyramids (e.g., image pyramid 410) created from received images 402.

The fusion module 424 is configured to receive, from the DMA 418, a first image pyramid 428 and a second image pyramid 426, and fuse the first and second image pyramids to generate a fused image pyramid 430. In some embodiments, the first and second images pyramids 428 and 426 correspond to image pyramids 410 generated by the pyramid generator 408, using respectively, first and second images of the received images 402 captured by the image sensor system 201. In some embodiments, at least one of the first and second image pyramids 428 and 426 corresponds to a previously fused image pyramid (e.g., a previous fused pyramid 430). How the first and second image pyramids 428 and 426 are received by the fusion module 424 may depend upon a current image fusion scheme (e.g., streaming, two-frame fusion, IIR, FIR, etc.) implemented by the fusion module 424 (e.g., as instructed by the controller 208). In some embodiments, the fusion module 424 may be able to receive a generated pyramid 410 directly from the pyramid generator 408 (e.g., without going through the DMA 418).

The fusion module 424 comprises a warping circuit 432 and an image fusion processor 434. The warping circuit is configured to warp the second image pyramid 426 based upon one or more warping parameters 406 (determined by the image registration processor 404) to align the images of the second image pyramid 426 with those of the first image pyramid 428 (which may be referred to as a primary or reference image pyramid). The warping circuit 432 performs a linear or non-linear transformation defined by the model generated by the image registration processor 404. Warping circuit 432 warps the second image pyramid 426 using the mapping information according to the warping parameters 406 to generate a warped version of the second image pyramid 426 (warped image pyramid 436) spatially better aligned to the image of the first image pyramid 428 (e.g., a primary image or reference image) than to the image of the second image pyramid 426. In some embodiments, the warping circuit 432 is a multi-scale warping circuit configured to warp each stage of the second image pyramid 426 to produce the warped image pyramid 430, comprising an unscaled warped single-color image and plurality of downscaled warped multi-color images.

The warped image pyramid 436 generated by warping circuit 432 is then passed onto image fusion processor 434. Image fusion processor 434 performs per pixel blending between a portion of the images of the warped image pyramid 436 generated from the second image pyramid 426 with a portion of the images of the first image pyramid 428 to generate the fused image pyramid 430. The fused pyramid includes an unscaled single color image and one or more downscaled images having multiple color components, each downscaled image corresponding to a downscaled version of a previous stage of the fused image pyramid 430. The fused image pyramid 430 (also referred to as a reconstructed pyramid) may be received by the DMA 418 (e.g., via the MUX 412) to be stored in memory (e.g., DRAM 422) for use in subsequent image fusion operations, based upon a current image fusion scheme implemented by the image fusion circuit 400. In addition, at least a portion of the fused image pyramid 430 is passed onto the noise reduction circuit 442 and the post-processor 444 for further processing and enhancement (e.g., spatial processing). For example, in some embodiments, the unscaled single color version 438 and a first downscaled stage 440 of the fused image pyramid 430 are passed to the noise reduction circuit 442 and the post-processor 444. The first downscaled version 440 corresponds to a first downscaled level of the fused image pyramid 436, and has a pixel resolution equal to a quarter of a pixel resolution of unscaled single color version 438. The image fusion processing circuit 434 includes multi-scale image fusion circuit 502 to produce the downscaled images of the fused image pyramid 430 (including first downscaled version 440), shown in FIG. 5A, and image fusion circuit 503 to produce the unscaled single color version 438 of the fused image pyramid 430, shown in FIG. 5B. More details about structure and operation of image fusion processing circuit 434 are provided below in detail in conjunction with FIGS. 5A-5B and FIGS. 6A-6B.

Noise reduction circuit 442 is configured to perform receive at least a portion of the fused image pyramid (e.g., unscaled single-color version 438 and first downscaled version 440) and perform noise reduction (e.g., multi-band noise reduction (MBNR)) to obtain a processed image pyramid (e.g., having processed unscaled single-color version 446 and processed first downscaled version 448). In some embodiments, the noise reduction circuit 442 further receives confidence values associated with each pixel of the unscaled single-color version 438 and first downscaled version 440, wherein an amount of noise reduction performed may be based upon the confidence values of the received images (e.g., a higher confidence value may indicate that less noise reduction is necessary). In some embodiments, the noise reduction circuit 442 may perform noise reduction on the images of the fused image pyramid based upon confidence values associated with each pixel of the images. In some embodiments, each pixel is associated with a confidence value specified using a predetermined number of bits (e.g., 4 bits). An invalid pixel (such as an overexposed pixel) may be marked with a confidence of 0. In some embodiments, the pyramid generator 408 may mark overexposed pixels of received images as having a confidence value of 0, and propagate the confidence value to all stages of the generated pyramid (e.g., using erosion morphological operation, described in greater detail in association with FIG. 6A below).

Post-processor 444 is part of color processing stage 312 and performs post-processing of the processed unscaled single color version 446 and the processed first downscaled version 448 of the processed image pyramid received from the noise reduction circuit 442 to obtain post-processed fused image 450. In some embodiments, post-processing circuit 450 includes a plurality of components (not shown) such as a sub-band splitter (SBS) circuit, a local tone mapping (LTM) circuit, a local contrast enhancement (LCE) circuit, a sub-band merger (SBM) circuit and a sharpening circuit. The SBS circuit performs sub-band splitting of processed unscaled single color version 446 to generate a high frequency component of the unscaled single color version passed onto the SBM circuit. The SBS circuit also performs sub-band splitting of processed first downscaled version 448 to generate a low frequency component of first downscaled version passed onto The LTM circuit. The LTM circuit performs LTM operation on the received low frequency component of the first downscaled version to generate a processed version of low frequency component of the first downscaled version passed onto the LCE circuit. The LCE circuit performs local photometric contrast enhancement of a single color component (e.g., luma component) of the processed version of the low frequency component of the first downscaled version to generate an enhanced version of first downscaled version of the fused image. The SBM circuit merges the high frequency component of the unscaled single color version (received from the SBS) and the enhanced version of the first downscaled version of the fused image (received from the LCE) to generate merged fused image data that is passed onto the sharpening circuit, which performs sharpening (e.g., photometric contrast enhancement) on a single color component (e.g., luma component) of the merged fused image data to generate post-processed fused image 472. Post-processed fused image 472 can be passed to output rescale 314 and then output interface 316 (illustrated in FIG. 3). The processing performed at post-processor 444 is merely an example, and various other post-processing may be performed as an alternative or as an addition to the processing at post-processor 444.

As illustrated in FIG. 4, the image pyramids 410 generated by the pyramid generator 408 (using received images 402) and the reconstructed pyramid 430 generated by the image fusion module 424 (by fusing received image pyramids) can each be received by the DMA 418 for storage in memory. In addition, image pyramids stored in memory (through the DMA 418) may be received as first/second image pyramids 428/426 for fusion by the fusion module 424. As such, various schemes involving fusion of different combinations of generated image pyramids and reconstructed image pyramids can be implemented, based upon a current application of the image fusion circuit 400. For example, for generating HDR images, long exposure images and short exposure images may be received as images 402 and used to create generated pyramids 410. Pairs of generated pyramids (e.g., comprising pyramids of corresponding long exposure and short exposure images) may be stored in memory (e.g., cache 420 and DRAM 422) and received by the fusion module 424 to be fused into an HDR image. On the other hand, for performing temporal filtering, reconstructed pyramids 436 generated by the fusion module 424 may be stored in memory as a history pyramid, to be fused with generated pyramids 410 corresponding to newly received images 402. The controller 208 may configure the operations of the image fusion circuit 400 in accordance with one or more predefined operating modes. For example, based upon a predefined configuration mode, the controller 208 may control operations of the data routing circuit 411 (e.g., including MUX 412 and DMA 418) to configure whether image pyramids 410 generated from received images 402 are raster or tile processed, and whether they are stored in the cache 420 or DRAM 422. The controller 208 further configures how the fusion module 424 receives first and second image pyramids 426, 428, and whether the resulting fused pyramid 430 stored back into memory (e.g., via the data routing circuit 411). In some embodiments, the controller 208 transmits a configuration mode parameter to components of the image fusion circuit 400 (e.g., the data routing circuit 411 and the fusion module 424) to configure the operations of the components in order to configure the components to allow the image fusion circuit 400 to operate in accordance with a selected configuration mode. For example, the controller 208 may transmit different configuration mode parameters to cause the image fusion circuit 400 to switch between different configuration modes.

Example Pixel Confidence Values

In some embodiments, each pixel of a received image frame is associated with a respective confidence value. In some embodiments, the confidence value indicates a level of pixel reliability. For example, a higher confidence value indicates a lower noise band standard deviation expected for the pixel, while a confidence value of 0 indicates an invalid pixel (i.e., standard deviation is infinite). In some embodiments, the standard deviation is calculated based upon a noise model (e.g., as a function of a pixel value from a look-up table (LUT), which may be pre-calculated using a photon shot noise and read noise approach). In some embodiments, the confidence value for a pixel of a single un-fused image frame may be either 0 or 1.

As images are fused together, the confidence value associated with a pixel may increase. In some embodiments, the confidence value is represented as a sequence of bits (e.g., 4 bits, thus having 16 possible values, from 0 to 15). For example, a pixel of a first image associated with a confidence value of 1 fused with a pixel of a second image associated with a confidence value of 1 may result in a fused pixel having a confidence value of 2. As such, in embodiments where confidence is expressed using four bits, the confidence value of a pixel of a fused image may indicate a number of valid image pixels used to produce the fused pixel of the image (up to a maximum value, e.g., 15). In some embodiments, the confidence value of a pixel of a fused image may be reduced due to ghost detection, so the confidence value for the pixel may be less than the number of valid image pixels used to produce the fused pixel of the image. As additional images are used, noise is reduced, resulting in lower standard deviation and higher confidence values.

In some embodiments, the confidence values of the pixels are used to determine how the image fusion circuit (e.g., the image fusion processor 434 illustrated in FIG. 4) fuses images. The image fusion circuit uses the confidence values to assign a weight to each pixel when performing image fusion. For example, when fusing a first pixel from an image corresponding to several other images fused together, and a second pixel from an image that has not been fused with any other images, the first pixel may be assigned a greater weight relative to the second pixel, as it already reflects the pixel data of multiple other images. The confidence value of the pixels may also be used to determine an amount of noise reduction to be performed on the pixels of the image (e.g., by the noise reduction circuit 442 illustrated in FIG. 4). For example, a higher confidence value indicates a lower standard deviation, and as such less noise reduction is needed to be applied to the pixels of the image.

In some embodiments, the confidence value for each pixel may be stored along with the value of the pixel. For example, in some embodiments, each pixel is represented using the YCbCr color space. Pixels of each component of the images may be stored using 16 bits for the component value (e.g., no dynamic range companding) and 4 bits for confidence value (20 bits total), or 12 bits (e.g., with companding) for component value and 4 bits for confidence value (16 bits total) per color component of the image. In some embodiments, each pixel may correspond to a single confidence value, instead of a confidence value for each component of the pixel.

Example Architecture for Image Fusion Processing

As illustrated in FIG. 4, the image fusion processor 424 may comprise a multi-scale image fusion circuit 502 and an image fusion circuit 503 for fusing the warped image pyramid 436 and the first image pyramid 428. The multi-scale image fusion circuit 502 is configured to fuse stages 1 through n of the received image pyramids (corresponding to downscaled full-color images), while the image fusion circuit 503 fuses stage 0 of the image pyramids (corresponding to an unscaled single-color image).

Figure 5A:
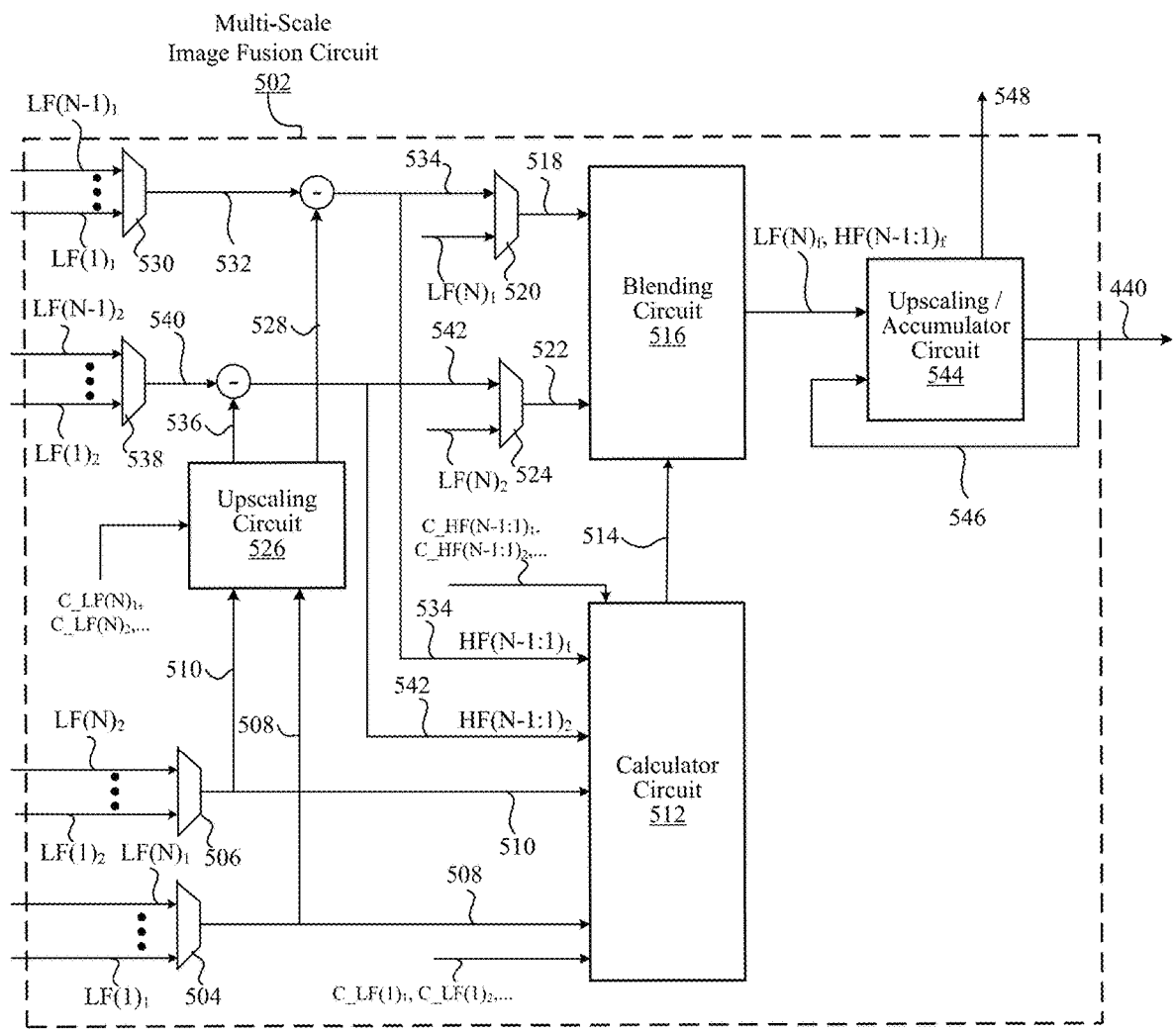
FIG. 5A is a detailed block diagram of a multi-scale image fusion circuit of an image fusion processor, according to one embodiment.

FIG. 5A is a detailed block diagram of multi-scale image fusion circuit 502 as part of image fusion processing circuit 434, according to one embodiment. Multi-scale image fusion circuit 502 performs per pixel blending between each downscaled multi-color stage of warped image pyramid 436 with a corresponding downscaled multi-color stage of the first image pyramid 428 to generate downscaled multi-color stages of a fused image pyramid 430. For example, the multi-scale image fusion circuit 502 generates first downscaled stage of fused image pyramid 430 (e.g., first downscaled stage 440) by upscaling and accumulating the multiple downscaled stages of the fused image pyramid. The first downscaled stage of fused image pyramid 430 includes multiple color components and has a pixel resolution lower than a pixel resolution of unscaled single color stage of fused image pyramid 430.

Multi-scale image fusion circuit 502 receives low frequency components of the downscaled multi-color warped images $LF(1)_1, LF(2)_1, \ldots, LF(N)_1$ as part of warped image pyramid 436 (obtained by warping each stage of the second image pyramid 426), where N represents levels of downsampling performed on the stage of the warped image pyramid 430, e.g., for an image pyramid having seven stages 0 through 6, stage 0 would correspond to the unscaled single-color image of the pyramid, and N=6 represents 6 levels of downscaling. Multi-scale image fusion circuit 502 further receives low frequency components of the downscaled multi-color images $LF(1)_2, LF(2)_2, \ldots, LF(N)_2$ as part of the second image pyramid 428. The downscaled warped image with the lowest level of resolution $LF(N)_1$ is first passed via multiplexer 504 onto calculator circuit 512 as downscaled warped image data 508. The downscaled image with the lowest level of resolution $LF(N)_2$ is also passed via multiplexer 506 onto calculator circuit 512 as downscaled image data 510. The calculator circuit 512 further receives confidence values associated with the pixels of the received downscaled images ($LF(N)_1$ and $LF(N)_2$).

Calculator circuit 512 determines a patch distance for a pixel by processing photometric distances between pixels in a patch of downscaled warped image data 508 and corresponding pixels in a patch of downscaled image data 510. The patch of downscaled warped image data 508 includes the pixel as a central pixel and other pixels within defined spatial distance from the pixel. A patch distance represents a measure of similarity between two patches. Calculator circuit 512 calculates the patch distance as a sum of Euclidian distances between corresponding pixels in both patches. For 5×5 patches, calculator circuit 512 calculates the patch distance as:

$$PD = \Sigma_{i=-2}^{i=2} \Sigma_{j=-2}^{2} ED(P1_{ij}, P2_{ij}) \qquad \text{Equation 1}$$

where $ED(P1_{ij}, P2_{ij})$ is an Euclidian distance between pixels $P1_{ij}$ and $P2_{ij}$ of the first and second patch; i and j are indexes within a 5×5 patch window. Optionally, the patch size can be reduced to 3×3 or to 1×1 (a single pixel mode) independently for each scale, in which case the summation indexes i and j in Equation 1 are adjusted accordingly.

Alternatively, calculator circuit 512 calculates the patch distance in a recursive manner. If PD(n) for pixel n is known, then calculator circuit 512 calculates PD(n+1) for next right horizontal neighbor of pixel n as:

$$PD(n+1) = PD(n) - \Sigma_{j=-2}^{2} ED(P1_{3,j}, P2_{3,j}) + \Sigma_{j=-2}^{2} ED(P1_{2,j}, P2_{2,j}) \qquad \text{Equation 2}$$

Calculator circuit 512 also determines a cross-correlation value (e.g., normalized cross-correlation) for the pixel by determining a cross variance between pixel values of the patch of downscaled warped image data 508 and pixel values of the patch of downscaled image data 510. The normalized cross-correlation is used as a secondary measure of patch similarity. Calculator circuit 512 calculates the normalized cross-correlation (e.g., a coefficient between −1 and 1) as:

$$NCC = \frac{VARC}{\sqrt{VAR1 * VAR2}} \qquad \text{Equation 3}$$

where VAR1 and VAR2 are variances of the patches and VARC is their cross variance.

Calculator circuit 512 determines blend parameter 514 for the pixel as a function of one or more similarity measures, e.g., the patch distance (e.g., PD determined by Equation 1 or Equation 2) and the cross-correlation value (e.g., the normalized cross correlation NCC determined by Equation 3). If the patches are more similar, a higher level of blending is performed to avoid ghosting, and vice versa. In some embodiments, the patch distance similarity score, SPD, is given by:

$$SPD = F1(PD/\text{expected noise standard variation}). \qquad \text{Equation 4}$$

In accordance with Equation 4, SPD indicates that patches that differ less than an expected noise are similar ("close"). The NCC similarity score, SNCC, is given by:

$$SNCC = F2(1-\max(0, NCC)), \qquad \text{Equation 5}$$

where functions F1 and F2 are non-linear functions, e.g., Gaussian shaped functions that can be emulated with defined slope and knee parameters. A final similarity score, S, may be determined as a sum of SPD and SNCC. For example, the final similarity score can be determined as:

$$S = \min(1, SPD+SNCC) \qquad \text{Equation 6}$$

Alternatively, the final similarity score, S, may be determined based on some other combination of SPD and SNCC. In some embodiments, the similarity score S may be based upon an output of a ghost detector, and may correspond to a value between 0 and 1.

In some embodiments, the calculator circuit 512 determines the blend parameters 514 based upon the received confidence values corresponding to the pixels of the patch of downscaled warped image data 508 and corresponding pixels of the patch of downscaled image data 510. For example, the calculator circuit 512 may determine blend parameter 514 for a pixel as a normalized combination of a weight W1 for the pixel of a reference image (a first image) and a weight W2 for a pixel of a second image. In some embodiments, the weights W1 and W2 are based on desired preprogrammed values. The weights W1 and W2 are adjusted based upon the confidence value of the respective pixels. For example:

$$W1 = \text{Weights}(1)*C1 \qquad \text{Equation 7}$$

$$W2 = \text{Weights}(2)*C2$$

where Weights (1) and Weights (2) correspond to preprogrammed weight values, and C1 and C2 correspond to confidence values of the respective pixels.

In some embodiments, the weights W1 and W2 may be modified by the determined similarity score S, to generate that actual per pixel weight values w1 and w2 to be used for blending that takes into account confidence and similarity. For example, the blend parameters may be determined as a combination of w1=W1 and w2=W2*S, such that if the patches are completely dissimilar (e.g., S=0), then only the pixel from the reference image is used. On the other hand, if the patched are completely similar (e.g., S=1), then fusion with weights w1=W1 and w2=W2 is performed. The ghost suppression is achieved by decreasing (in some cases to 0) weights of pixels that originate from dissimilar second image regions. Blend parameters 514, may comprise a normalized alpha blending parameter alphaNorm (e.g., for a secondary pixel to be fused) and a normalized beta blending parameter betaNorm (e.g., for a primary pixel to be fused, which may be is given by:

$$\text{alphaNorm} = w2/(w1+w2) \quad \text{betaNorm} = 1-\text{alphaNorm} \qquad \text{Equation 8}$$

In some embodiments, blend parameter 514 is set to zero for pixels (e.g., clipping markers) marked by a clipping marker circuit as overexposed pixels and their derivatives are not used for blending, thus achieving proper handling of highlights in the high dynamic range case.

Blend parameters 514 for the pixel is passed onto blending circuit 516. Blending circuit 516 blends pixel value 518 of the pixel of the downscaled warped image $LF(N)_1$ (passed via multiplexer 520 onto blending circuit 516) with pixel value 522 of a corresponding pixel of the downscaled image $LF(N)_2$ (passed via multiplexer 524 onto blending circuit 516) using blend parameter 514 for the pixel as determined by the calculator circuit 512, to generate a blended pixel value for a pixel of a downscaled fused image with the lowest level of resolution $LF(N)_f$ passed onto upscaling/accumulator circuit 544. Blending circuit 516 blends a pair of pixel values $x_1(i,j)$ and $x_2(i,j)$ in two different images (e.g., images $LF(N)_1$, $LF(N)_2$) corresponding to the same spatial coordinate (i,j) in both images using blend parameters 514 alphaNorm and betaNorm to a obtain a blended pixel value b(i,j) as given by:

$$b(i,j) = \text{betaNorm}(i,j)*x_1(i,j) + \text{alphaNorm}(i,j)*x_2(i,j) \qquad \text{Equation 9}$$

The downscaled warped image $LF(N)_1$ and downscaled image $LF(N)_2$ are also passed (via multiplexers 504 and 506) as downscaled warped image data 508 and downscaled image data 510 onto upscaling circuit 526. Upscaling circuit 526 upscales downscaled warped image data 508 two times in both horizontal and vertical dimensions to generate upscaled warped image data 528 (scale N−1). In addition, the upscaling circuit 526 further receives the confidence values corresponding to the pixels of the patch of downscaled warped image data 508 (e.g., C1), and upscales the confidence values along with the pixels of the downscaled image, such that each pixel of the upscaled image is associated with an upscaled confidence value.

Multiplexer 530 passes downscaled warped image $LF(N-1)_1$ as downscaled warped image data 532. Pixel values of upscaled warped image data 528 are subtracted from corresponding pixel values of downscaled warped image data 532 (scales N−1) to generate warped image data 534 representing a high frequency component of downscaled warped image $HF(N-1)_1$ passed onto calculator circuit 512 and onto blending circuit 516 (via multiplexer 520) as pixel values 518.

Upscaling circuit 526 also upscales downscaled image data 510 two times in both horizontal and vertical dimensions to generate upscaled image data 536 (scale N−1). In addition, the upscaling circuit 526 receives and upscales the confidence values corresponding to the pixels of the patch of downscaled image data 510 (e.g., W2), such that each pixel of the upscaled image data 536 is associated with an upscaled confidence value. Multiplexer 538 passes downscaled image $LF(N-1)_2$ as downscaled image data 540. Pixel values of upscaled image data 536 are subtracted from downscaled image data 540 (scales N−1) to generate image data 542 representing a high frequency component of downscaled image HF(N-1)$_2$ passed onto calculator circuit 512 and onto blending circuit 516 (via multiplexer 524) as pixel values 522.

Calculator circuit 512 determines a patch distance for a pixel of warped image data 534 by processing photometric distances between pixels in a patch of warped image data 534 (e.g., the high frequency component of downscaled warped image HF(N-1)$_1$) and corresponding pixels in a patch of image data 542 (e.g., the high frequency component of downscaled image HF(N-1)$_2$), as defined by Equation 1 or Equation 2. The downscaled warped image LF(N-1)$_1$ is further passed via multiplexer 504 onto calculator circuit 512 as downscaled warped image data 508. The downscaled image LF(N-1)$_2$ is also passed via multiplexer 506 onto calculator circuit 512 as downscaled image data 510. Calculator circuit 512 determines a cross-correlation value (e.g., normalized cross-correlation) for the pixel by determining a cross variance between pixel values of a patch of downscaled warped image data 508 (e.g., the low frequency component of the downscaled warped image LF(N-1)$_1$) and pixel values of the patch of downscaled image data 510 (e.g., the low frequency component of the downscaled image LF(N-1)$_2$), as defined by Equation 3.

Calculator circuit 512 determines blend parameter 514 for the pixel as a function of the patch distance and the cross-correlation value, as well as the weight values associated with the pixels of the received images, e.g., as defined above in accordance with Equations 4-8 but for high frequency components of the downscaled warped image HF (N-1)$_1$ and the downscaled image HF(N-1)$_2$). Blend parameter 514 for the pixel is passed onto blending circuit 516. Blending circuit 516 blends pixel value 518 of the pixel of the high frequency component of downscaled warped image HF(N-1)$_1$ with pixel value 522 of a corresponding pixel of the high frequency component of downscaled image HF(N-1)$_2$ using blend parameter 514 for the pixel (as defined by Equation 9) to generate a blended pixel value for a pixel of a high frequency component of downscaled fused image HF(N-1)$_f$ passed onto upscaling/accumulator circuit 544. This process of determining blending parameter 514, upscaling by upscaling circuit 526 and per-pixel blending by blending circuit 516 is recursively repeated until a high frequency component of a first downscaled version of fused image HF(1)$_f$ is generated at the output of blending circuit 516 and passed onto upscaling/accumulator circuit 544.

Figure 6A:
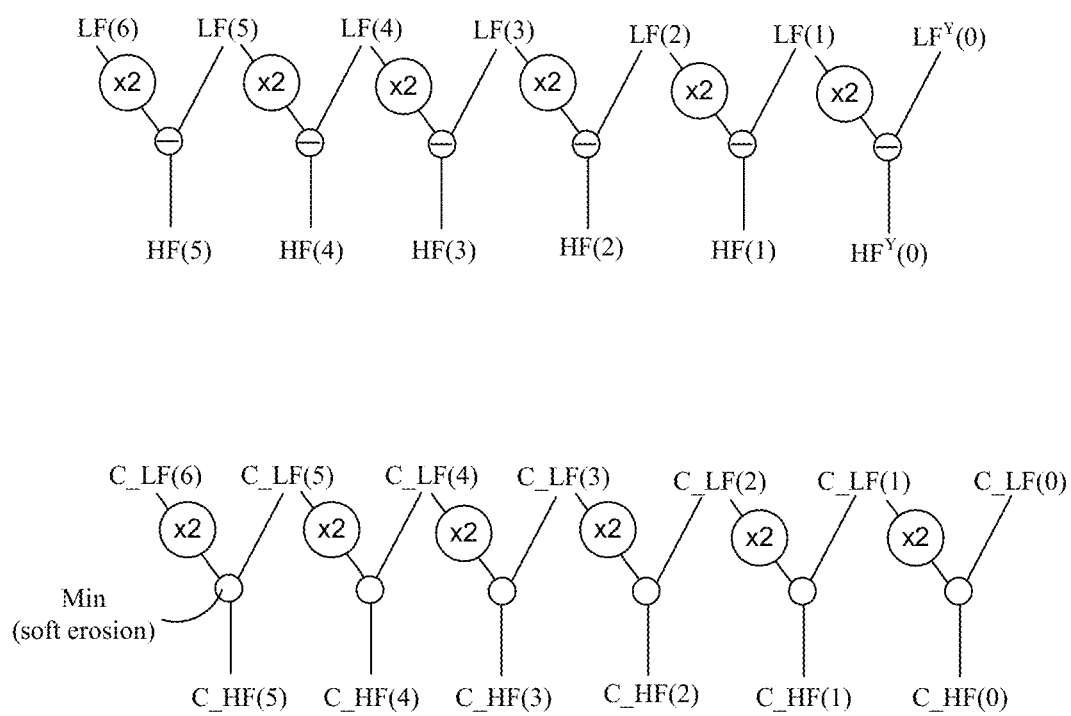
FIG. 6A is a conceptual diagram illustrating high frequency extraction and soft confidence erosion, which is performed by upscaling pyramid layers (image samples and sample confidence measures), according to one embodiment.

FIG. 6A is a conceptual diagram illustrating upscaling downscaled images and their associated confidence values as part of recursive image fusion processing shown in FIG. 5A, according to one embodiment. In the example of FIG. 6A, an input image (e.g., warped image 430 or processed image 438) is assumed to be downscaled 6 times (e.g., by pyramid generator 408) to generate low frequency components of downscaled images LF(6), LF(5), LF(1) that are input into multi-scale image fusion circuit 502. Upscaling circuit 526 upscales the low frequency component of downscaled image LF(6) two times in both horizontal and vertical dimensions. In some embodiments, the upscaling is performed using a 3×3 kernel. The upscaling circuit 526 subtracts the upscaled version of LF(6) from the low frequency component of downscaled image LF(5) to generate a high frequency component of downscaled image HF(5) (e.g., warped and non-warped image data 534 and 542) passed onto calculator circuit 512 and blending circuit 516. Then, upscaling circuit 526 upscales the low frequency component of downscaled image LF(5) two times in both horizontal and vertical dimensions and subtracts its upscaled version from the low frequency component of downscaled image LF(4) to generate a high frequency component of downscaled image HF(4) (e.g., warped and non-warped image data 534 and 542) passed onto calculator circuit 512 and blending circuit 516. This process is repeated by upscaling circuit 526 until a high frequency component of first downscaled version HF(1) (e.g., warped and non-warped image data 534 and 542) is generated and passed onto calculator circuit 512 and blending circuit 516.

In addition, the upscaling circuit 526 upscales the confidence values of the low frequency components of downscaled images C_LF(6), C_LF(5), ..., C_LF(1) to generate confidence values for the high frequency components of downscaled images C_HF(5), C_HF(4), ..., C_HF(1). Upscaling circuit 526 upscales the confidence of low frequency component of downscaled image C_LF(6) two times in both horizontal and vertical dimensions and compares its upscaled version to the confidence of low frequency component of downscaled image C_LF(5) to generate a confidence for the high frequency component of downscaled image C_HF(5) passed onto calculator circuit 512 and blending circuit 516, wherein the confidence C_HF(5) may be determined to correspond to the minimum of the upscaled version of C_LF(6) and C_LF(5) (e.g., using a minimum or soft erosion function). Then, upscaling circuit 526 upscales the confidence of the low frequency component of downscaled image C_LF(5) two times in both horizontal and vertical dimensions and compares its upscaled version to the confidence of the low frequency component of downscaled image C_LF(4) to generate a confidence of the high frequency component of downscaled image C_HF(4) (e.g., based on a minimum or soft erosion function) passed onto calculator circuit 512 and blending circuit 516. This process is repeated by upscaling circuit 526 until a confidence of a high frequency component of first downscaled version C_HF(1) is generated and passed onto calculator circuit 512 and blending circuit 516. In some embodiments, confidence values for the high frequency components of downscaled images may be determined by:

$$C(s) = \min(\text{input}.C(s), \text{upscaleConf2}(\text{input}.C(s+1))) \quad \text{Equation 10}$$

where C(s) is an output confidence corresponding to a high frequency component of a level s downscaled image (e.g., C_HF(s)), input.C(s) and input.C(s+1) correspond to input confidences of levels s and s+1 downscaled images (e.g., C_LF(s) and C_LF(s+1), respectively), and upscaleConf2 corresponds to a confidence upscaling function (e.g., soft erosion with a kernel, where the kernel size, e.g., 3×3, is selected to be the same as kernel used for actual signal upscaling for high frequency extraction). For confidence levels corresponding to a lowest downscaled level of the image pyramid (e.g., s=6), because there is no previous s+1 level, the output confidence C(s) may be equal to the input confidence input.C(s) (e.g., C_HF(6)=C_LF(6)).

Referring back to FIG. 5A, upscaling/accumulator circuit 544 performs the process of image restoration to generate first downscaled version 448 of the fused image using fused downscaled versions LF(N)$_f$, HF(N-1)$_f$, HF(N-2)$_f$ ..., HF(1)$_f$. More details about this process is described herein with reference to FIG. 6B.

Figure 6B:
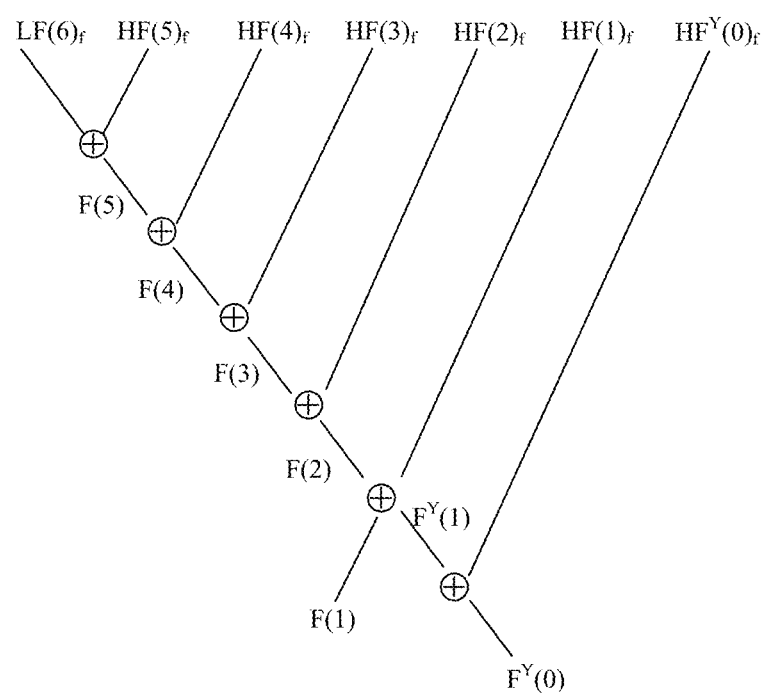
FIG. 6B is a conceptual diagram illustrating final image reconstruction, which is performed by recursively upscaling and accumulating downscaled images as part of image fusion processing, according to one embodiment.

FIG. 6B is a conceptual diagram illustrating recursively upscaling and accumulating downscaled images as part of image fusion processing, according to one embodiment. While the fused image for the lowest downscaled level (e.g., level 6) of the fused image pyramid may be obtained by fusing the corresponding images of the two image pyramids to be used, fused upper level images of the fused image pyramid may be obtained by fusing the high frequency image data and then combining the fused high frequency component of level N with the fused pyramid scale N+1 from the previous fusion step, as illustrated in FIG. 6B. In the example of FIG. 6B, blending circuit 516 generates fused downscaled versions LF(6)$_f$, HF(5)$_f$, HF(4)$_f$, ..., HF(1)$_f$ (based on blending parameters 514 as determined by the calculator circuit 512 using the similarity measures and confidence values of the received image pyramids) passed onto upscaling/accumulator circuit 544. Upscaling/accumulator circuit 544 upscales fused downscaled version LF(6)$_f$ two times in both horizontal and vertical dimensions and sums its upscaled version with fused downscaled version HF(5)$_f$ to generate downscaled fused image 546, e.g., F(5). Upscaling/accumulator circuit 544 upscales downscaled fused image 546 (e.g., F(5)) two times in both horizontal and vertical dimensions and sums its upscaled version with fused downscaled version HF(4)$_f$ to generate downscaled fused image 546, e.g., F(4). This process is repeated until upscaling/accumulator circuit 544 generates first downscaled version of fused image 440, e.g., fused image F(1) comprising the multiple color components. In addition, the upscaling/accumulator circuit 544 may upscale and accumulate confidence values for each of the fused downscaled low-frequency and high-frequency images to determine confidence values for the downscaled fused images. In some embodiments, the confidence value C_fused of a pixel of the fused image may be determined based on the confidence values C1 and C2 of the corresponding image pyramid pixels used to obtain the fused image pixel as:

$$C\_fused = C1 * C2 / (alphaNorm^2 * C1 + betaNorm^2 * C2);$$ Equation 11

The resulting images $F^Y(\mathbf{0})$ and F(1) may correspond to the unscaled single color image 438 and the processed first downscaled image 440 of the fused image pyramid 430 sent to the noise reduction circuit 442 and post-processor 444 for additional processing. In addition, the various downscaled fused images (e.g., F(5), F(4), ...) may also be transmitted to the data routing circuit 411 as the downscaled images of the fused pyramid 430.

Figure 5B:
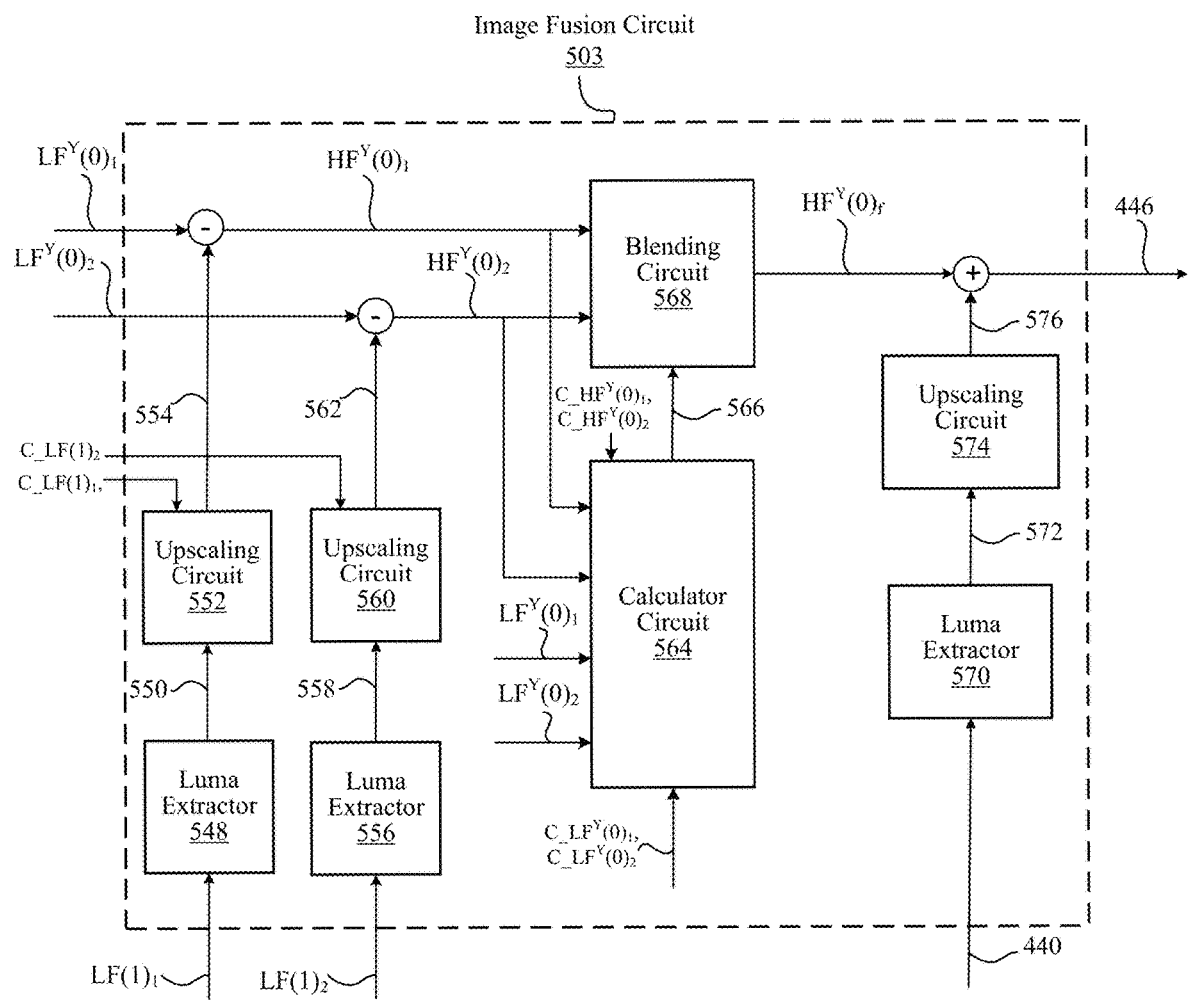
FIG. 5B is a detailed block diagram of an image fusion circuit of the image fusion processor, according to one embodiment.

FIG. 5B is a detailed block diagram of image fusion circuit 503 as part of image fusion circuit 503, according to one embodiment. Image fusion circuit 503 performs per pixel blending between unscaled single color version (e.g., luma component) of warped image 430, $LF^Y(\mathbf{0})_1$, with unscaled single color version (e.g., luma component) of processed image 438, $LF^Y(\mathbf{0})_2$, to generate unscaled single color version of fused image 438. Image fusion circuit 503 receives, as part of warped image pyramid 436 and the second image pyramid 428, unscaled single color version $LF^Y(\mathbf{0})_1$ and unscaled single color version $LF^Y(\mathbf{0})_2$, respectively. Image fusion circuit 503 further receives, downscaled warped image LF(1)$_1$ of warped image pyramid 436 and downscaled image LF(1)$_2$ of the second image pyramid 428.

Luma extractor circuit 548 extracts a single color component (luma component) from downscaled warped image LF(1)$_1$ to generate single color version of downscaled warped image 550 passed onto upscaling circuit 552. Upscaling circuit 552 upscales single color version of downscaled warped image 550 twice in both spatial dimensions to generate single color version of upscaled warped image 554. In addition, upscaling circuit 552 receives and upscales confidence values associated with the downscaled warped image LF(1)$_1$ to generate upscaled confidence value for the upscaled warped image. Pixel values of single color version of upscaled warped image 554 are subtracted from corresponding pixel values of unscaled single color version $LF^Y(\mathbf{0})_1$ to generate a high frequency component of unscaled single color version of warped image $HF^Y(\mathbf{0})_1$ passed onto calculator circuit 564 and blending circuit 568. In addition, the confidence value of $HF^Y(\mathbf{0})_1$ may be determined based on a minimum of the confidence values for $LF^Y(\mathbf{0})_1$ and the upscaled LF(1)$_1$. Unsealed single color version $LF^Y(\mathbf{0})_1$ and its confidence values are also passed onto calculator circuit 564.

Luma extractor circuit 556 extracts a single color component (luma component) from downscaled image LF(1)$_2$ to generate single color version of downscaled image 558 passed onto upscaling circuit 560. Upscaling circuit 560 upscales single color version of downscaled image 558 twice in both spatial dimensions to generate single color version of upscaled image 562. In addition, upscaling circuit 552 receives and upscales confidence values associated with the downscaled warped image LF(1)$_2$ to generate upscaled confidence value for the upscaled warped image. Pixel values of single color version of upscaled image 562 are subtracted from corresponding pixel values of unsealed single color version $LF^Y(\mathbf{0})_2$ to generate a high frequency component of unsealed single color version $HF^Y(\mathbf{0})_2$ passed onto calculator circuit 564 and blending circuit 568. In addition, the confidence value of $HF^Y(\mathbf{0})_2$ may be determined based on a minimum of the confidence values for $LF^Y(\mathbf{0})_2$ and the upscaled LF(1)$_2$. Unsealed single color version $LF^Y(\mathbf{0})_2$ and its confidence values are also passed onto calculator circuit 564.

Calculator circuit 564 determines a patch distance for a pixel by processing photometric distances between pixels in a patch of the high frequency component of unsealed single color version of warped image $HF^Y(\mathbf{0})_1$ and corresponding pixels in a patch of the high frequency component of unsealed single color version $HF^Y(\mathbf{0})_2$, as defined by Equation 1 or Equation 2. Calculator circuit 564 operates in the same manner as calculator circuit 512 of multi-scale image fusion circuit 502 except that calculator circuit 564 processes single color images whereas calculator circuit 512 processes multi-color images. Calculator circuit 564 also determines a cross-correlation value for the pixel by determining a cross variance between pixel values of a patch of unsealed single color version $LF^Y(\mathbf{0})_1$ and corresponding pixel values of a patch of unsealed single color version $LF^Y(\mathbf{0})_2$, as defined by Equation 3. Calculator circuit 564 determines blend parameter 566 for the pixel based on similarity metrics (e.g., the patch distance and the cross-correlation value) and confidence values associated with the received image data (e.g., $HF^Y(\mathbf{0})_1$ and $HF^Y(\mathbf{0})_2$) (as defined in Equations 4-8). Blend parameter 566 for the pixel is passed onto blending circuit 568. Blending circuit 568 blends a pixel value of the pixel of the high frequency component of unsealed single color version of warped image $HF^Y(\mathbf{0})_1$ with a pixel value of a corresponding pixel of the high frequency component of unsealed single color version $HF^Y(\mathbf{0})_2$ using blend parameter 566 for the pixel (as defined by Equation 9) to generate a blended pixel value for a pixel of a high frequency component of unsealed single color version of fused image $HF^Y(\mathbf{0})_f$. Blending circuit 568 operates in the same manner as blending circuit 516 of multi-scale image fusion circuit 502 except that blending circuit 568 performs per pixel blending of single color images whereas blending circuit 516 performs per pixel blending of multi-color images.

Image fusion circuit 503 also receives first downscaled version of fused image 440 generated by multi-scale image fusion circuit 502. Luma extractor circuit 570 extracts a single color component (luma component) from first downscaled version of fused image 440 to generate single color version of first downscaled version of fused image 572 passed onto upscaling circuit 574. Upscaling circuit 574 upscales a single color version of first downscaled version of fused image 572 twice in both spatial dimensions (horizontal and vertical dimensions) to generate a single color version of upscaled fused image 576. Pixel values of single color version of upscaled fused image 576 are summed with corresponding pixel values of the high frequency component of unscaled single color version of fused image $HF^Y(0)_f$ to generate unscaled single color version of fused image 446. The unscaled single color version of the fused image 446 may be transmitted to the noise reduction circuit 442, and may also be transmitted to the data routing circuit 411 as the unscaled single color image of the fused pyramid 430.

As further shown in FIG. 6B, a single color component (e.g., luma component) is extracted (via luma extractor circuit 570) from the first downscaled multi-color version of fused image F(1) to generate a first downscaled single color version of fused image $F^Y(1)$. The first downscaled single color version of fused image is upscaled (via upscaling circuit 574) and summed to the high frequency component of unscaled single color version of fused image $HF^Y(0)_f$ to generate an unscaled single color version of fused image $F^Y(0)$, e.g., unscaled single color version 438. The resulting fused images $F^Y(0), F(1), F(2), \ldots F(5)$ collectively form the fused image pyramid 430.

In some embodiments, the image fusion processor 434 outputs only the unscaled single color image 438 and the processed first downscaled image 440 of the fused image pyramid 430 to the noise reduction circuit 442 and post-processor 444 for noise reduction and additional processing. On the other hand, the fused images $F(5), F(4), \ldots, F(1)$ and $F^Y(0)$ generated by the upscaling/accumulator circuit 544 may be assembled to form the fused image pyramid 430, which may be provided to the DMA 418 (e.g., via the MUX 412) and stored in memory (e.g., DRAM 422). This allows for the fused image pyramid to function as a history pyramid that may be later provided to the fusion module 424 (as the first image pyramid 426 or the second image pyramid 428) to be fused with additional images (e.g., image pyramid 410 generated based on received images 402). In some embodiments, the image fusion processor 434 may output the entire fused image pyramid 436 to the noise reduction circuit 442 and post-processor 444.

Example Process for Performing Image Fusion

Figure 7:
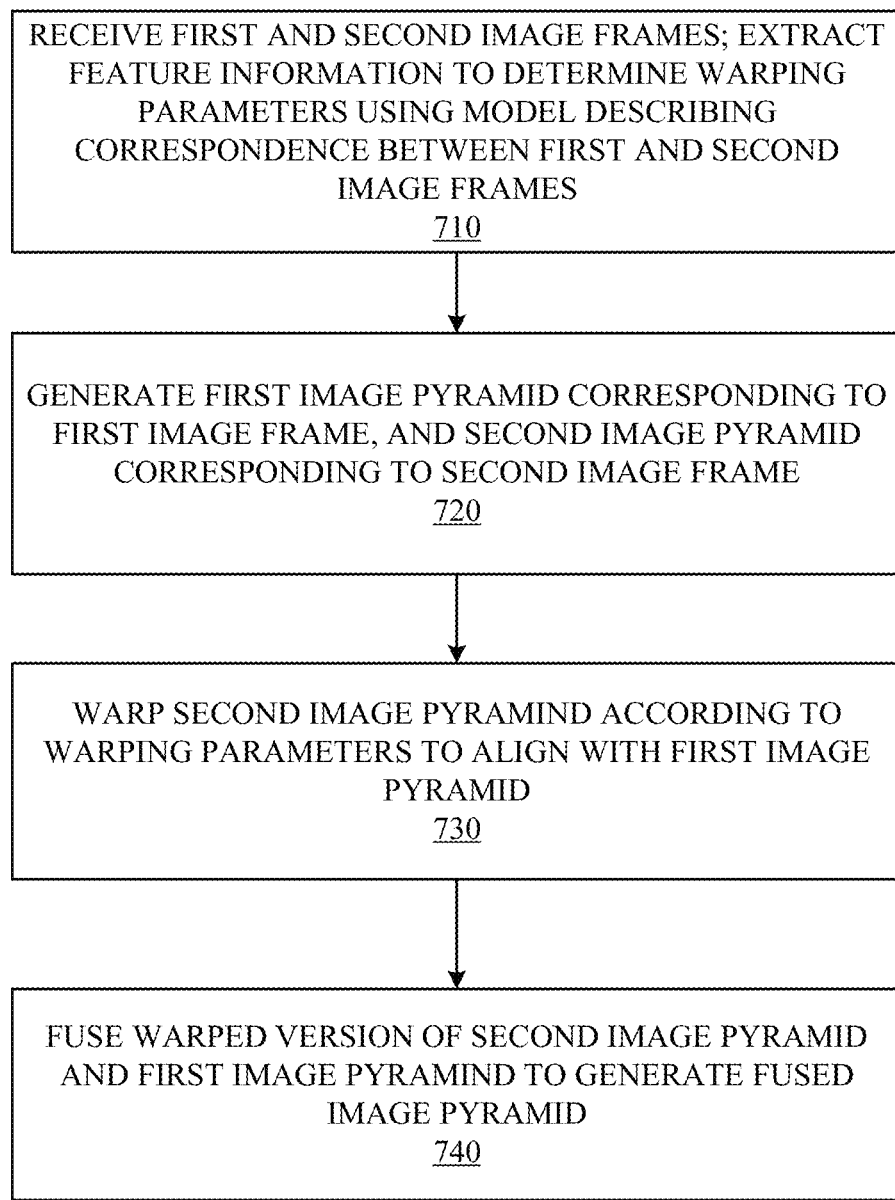
FIG. 7 is a flowchart illustrating a method of image fusion, according to one embodiment.

FIG. 7 is a flowchart illustrating a method of image fusion, according to one embodiment. The method may include additional or fewer steps, and steps may be performed in different orders. The method may be performed by image fusion circuitry of FIG. 4. The image fusion circuit (e.g., image fusion circuit 400 of FIG. 4) receives 710 first and second image frames (e.g., as images 402). The image registration processor 404 extracts feature information from at least the first image corresponding to first keypoints. A model describing correspondence between the first image and a second image is determined by processing at least the information about first keypoints, e.g., by running the RANSAC model fitting algorithm, and used to generate a set of warping parameters. In some embodiments, the first and second images are captured with different exposure times (e.g., the first image corresponding to a low exposure image, and the second image corresponding to a high exposure image).

The pyramid generator 408 generates 720 first and second image pyramids corresponding to the first and second images. Each generated image pyramid 410 comprises a plurality of stages, including a first stage corresponding to an unscaled single-color image, and a plurality of additional stages corresponding to full-color images with different levels of downscaling. In some embodiments, the generated pyramids may be stored in a memory. In other embodiments, at least one of the generated pyramids may be provided directly to the fusion module 424.

The fusion module 424 receives the generated pyramids, and warps 730 the second image pyramid in accordance with the determined warping parameters, to generate a warped image pyramid spatially more closely aligned with the first image pyramid than the second image pyramid.

The image fusion processor 434 of the fusion module 424 fuses 740 the warped image pyramid and the first image pyramid to generate a fused image pyramid. At least a portion of the fused image pyramid (e.g., an unscaled single-color image and a first downscaled multi-color image) are provided to a noise reduction circuit and/or post-processing for additional processing and generation of a single fused image. In addition, the fused image pyramid may be stored in memory and made available for additional fusion.

Configurable Temporal Processing Applications

As discussed in relation to FIG. 4, the image fusion circuit 400 is configurable to able to perform a variety of temporal processing applications (e.g., configuration mode) on received images 402, based on instructions from the controller 208. For example, the image fusion circuit 400 may switch between different configuration modes based on one or more configuration mode parameters received from the controller 208. Each configuration mode may specify one or more conditions controlling the operations of the image fusion circuit 400. For example, a configuration mode parameter for the data routing circuit 411 may control the data routing circuit 411 to store an image pyramid 410 of a received image in memory when a first condition is satisfied, and to have the image pyramids 410 of receives images bypass the memory (e.g., cached) when a second condition is satisfied. In addition, the fusion module 424 may output fused image pyramids back to the data routing circuit 411 or not based on a condition specified by the configuration mode, and/or output a fused image to the noise reduction circuit or not based on a condition specified by the configuration mode. The number of these possible applications are discussed below. It is understood that while specific applications are described below, the image fusion circuit 400 is not limited to the described applications.

A simplest configuration would be a "no temporal processing"/streaming application (also referred to as "spatial-only" processing), wherein the image fusion circuit 400 is configured such that generated pyramids of the received images 402 bypass the image fusion processor 434 (i.e., are not fused with other images), and output directly to the noise reduction circuit 442 for spatial processing. In some embodiments, the image pyramids may be first stored in a cache (e.g., cache 420) prior to bypassing the image fusion processing 434 and being received by the noise reduction circuit 442. In some embodiments, the pyramid generator 408 is configured to generate image pyramids of received images as normal. However, the fusion module 424 may receive only a first (primary) image pyramid and extract high frequency components from the received image pyramid. The noise reduction circuit 442 may receive the extracted high frequency components of the image pyramid for filtering and pyramid reconstruction.

Figure 8:
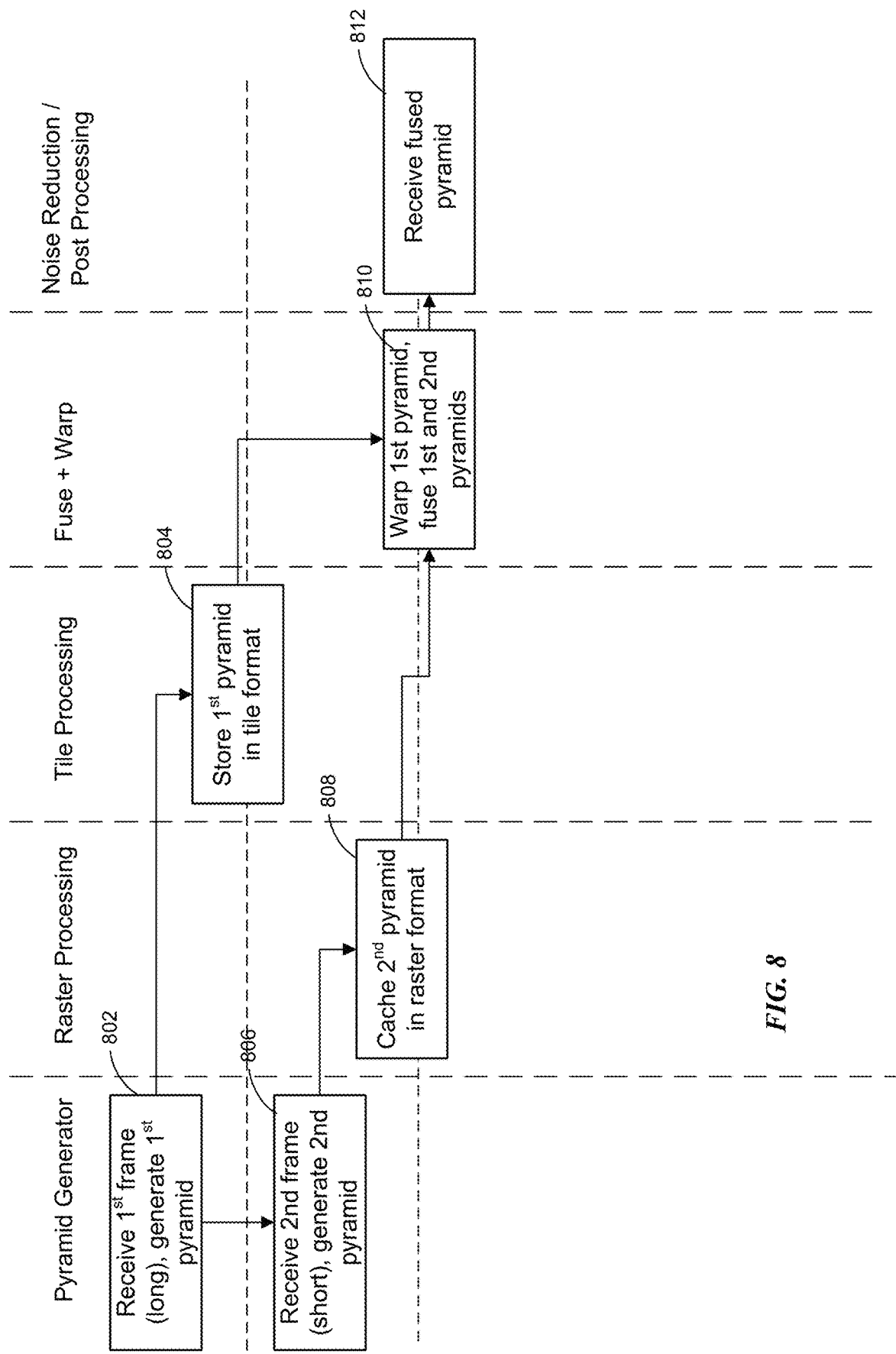
FIG. 8 illustrates a diagram describing a two-image fusion application that may be performed by the image fusion circuit, in accordance with some embodiments.

FIG. 8 illustrates a diagram describing a two image fusion application that may be performed by the image fusion circuit 400, in accordance with some embodiments. In some embodiments, two image fusion may be used to generate HDR images by fusing a first image having a long exposure time with a second image having a shorter exposure time. As illustrated in FIG. 8, the pyramid generator 408, at 802, receives a first image (e.g., long exposure image) and generates a first pyramid. At 804, the first pyramid is stored in tile format (e.g., at tile module 416) in memory (e.g., DRAM 422).

At 806, the pyramid generator 408, after receipt of the first image, receives a second image (e.g., short exposure image) and generates a second image pyramid. At 808, the second image pyramid is stored in raster format (e.g., at raster module 414). As the second image pyramid is to be used immediately for fusion, the second pyramid may be cached (e.g., using cache 420), which acts as a buffer when transmitting the second pyramid to the fusion module 424. As such, the data routing circuit 411 stores received image pyramids 410 in memory or bypasses memory (e.g., cached), based on a condition of whether the received pyramid 410 corresponds to a first image or a second image of a pair of images. In addition, the image registration processor 404 also receives the first and second images, and determines a set of warping parameters for warping the first image to be more spatially aligned with the second image (not shown in FIG. 8).

At 810, the fusion module 424 receives the first and second image pyramids (from DRAM 422 and cache 420 respectively). The fusion module 424 warps the first image pyramid in accordance with the set of warping parameters, and fuses the warped first image pyramid and the second image pyramid to generate a fused image pyramid. At 812, the fused image pyramid is output by the fusion module 424 and received by the noise reduction circuit 442 and post-processor 444. Because in this configuration the fused image pyramid does not need to be used for subsequent fusion, the fusion module 424 does not transmit the fused pyramid to the DMA 418 for storage in memory.

While FIG. 8 illustrates the pyramid of the first frame being warped and fused with the pyramid of the second frame (which functions as a reference frame), it is understood that in other embodiments, the first frame may be the reference frame, and the pyramid of the second frame is warped to align with the first frame for image fusion.

Figure 9:
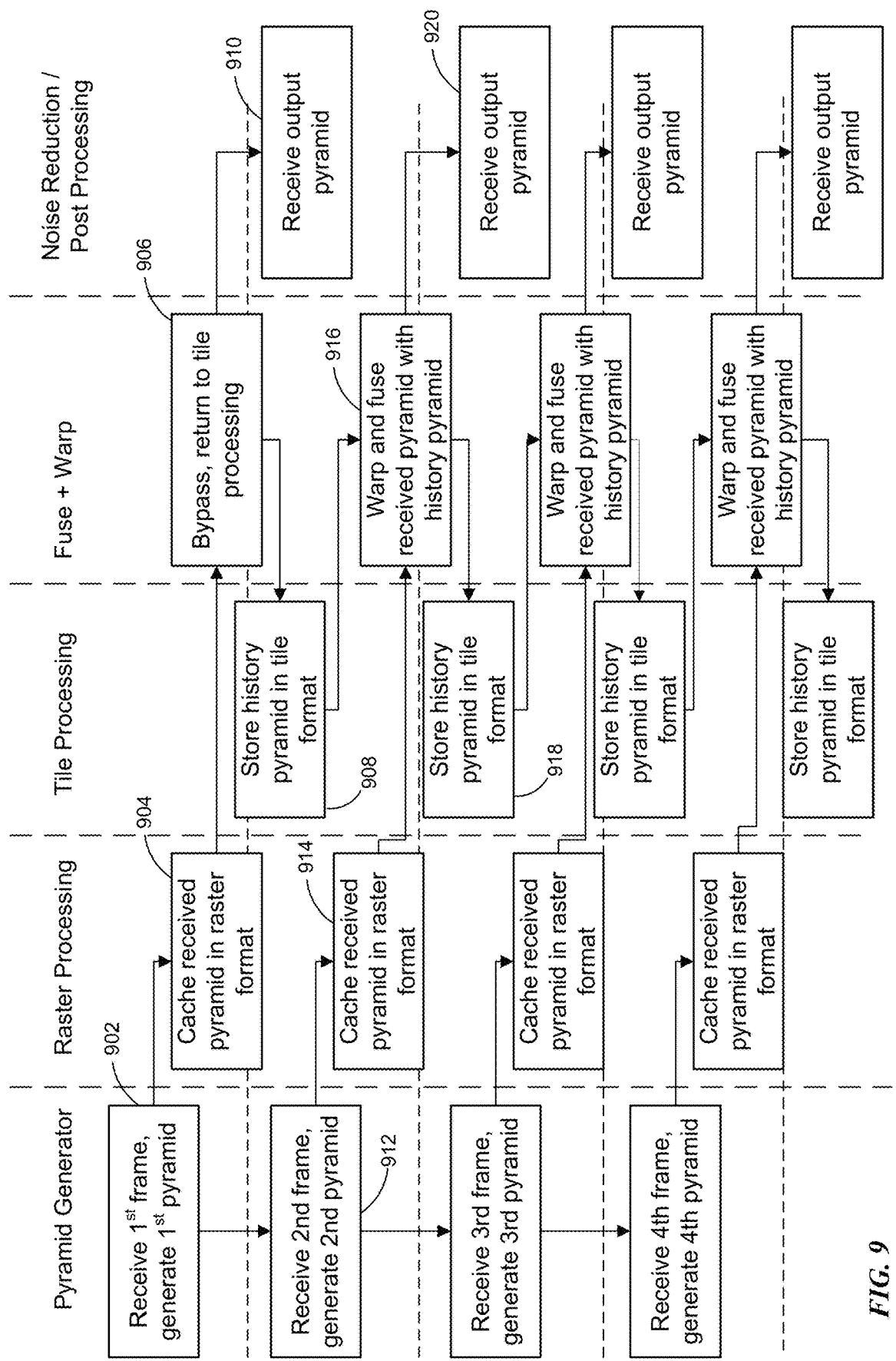
FIG. 9 illustrates a diagram describing a temporal filtering application that may be performed by the image fusion circuit, in accordance with some embodiments.

FIG. 9 illustrates a diagram describing a temporal filtering application that may be performed by the image fusion circuit 400, in accordance with some embodiments. In temporal filtering, the image fusion circuit 400 maintains a history frame corresponding to a fusion result of a previous temporal filtering step. As images are received by the image fusion circuit 400, they are fused with the history frame, the result of which is output to spatial processing. As the image fusion circuit 400 outputs images at the same rate as it receives them, this application may be used for video and preview, in which the ISP generates a stream.

As illustrated in FIG. 9, at 902, the pyramid generator 408 receives a first image frame and generates a corresponding pyramid. At 904, the generated pyramid is stored in cache (e.g., cache 420) in raster format. As discussed above, the cache 420 may act as a buffer and store only a portion of the pyramid at a time. As the first image is the first image frame received by the image fusion circuit 400, there is no history frame to be used for fusion, and the generated pyramid bypasses the fusion module 424 at 906, and is stored in memory (e.g., DRAM 422) in tile format as the history frame at 908. In addition, the generated pyramid may be output to spatial processing at 910. In some embodiments, the image fusion circuit 400 may be configured to automatically store in DRAM the pyramid of the first image in tile format without going through the fusion module 424.

At 912, the pyramid generator 408 continues to receive additional images (e.g., second image, third image, fourth image, etc.), and generates an image pyramid for each image as it is received. In addition, the image registration processor 404 also receives the images, and for each image, determines a set of warping parameters between the image and the history frame. At 914, the generated image pyramid is stored in cache 420 in raster format. At 916, the generated image pyramid and the pyramid of the history frame (stored in DRAM 422) are received by the fusion module 424, which warps the pyramid of the received image and fuses it with the history frame pyramid. The resulting fused pyramid is stored in DRAM at 918 in tile format for subsequent processing as a new history pyramid, as well as output for spatial processing at 920. The process may be repeated for subsequent received images.

Figure 10:
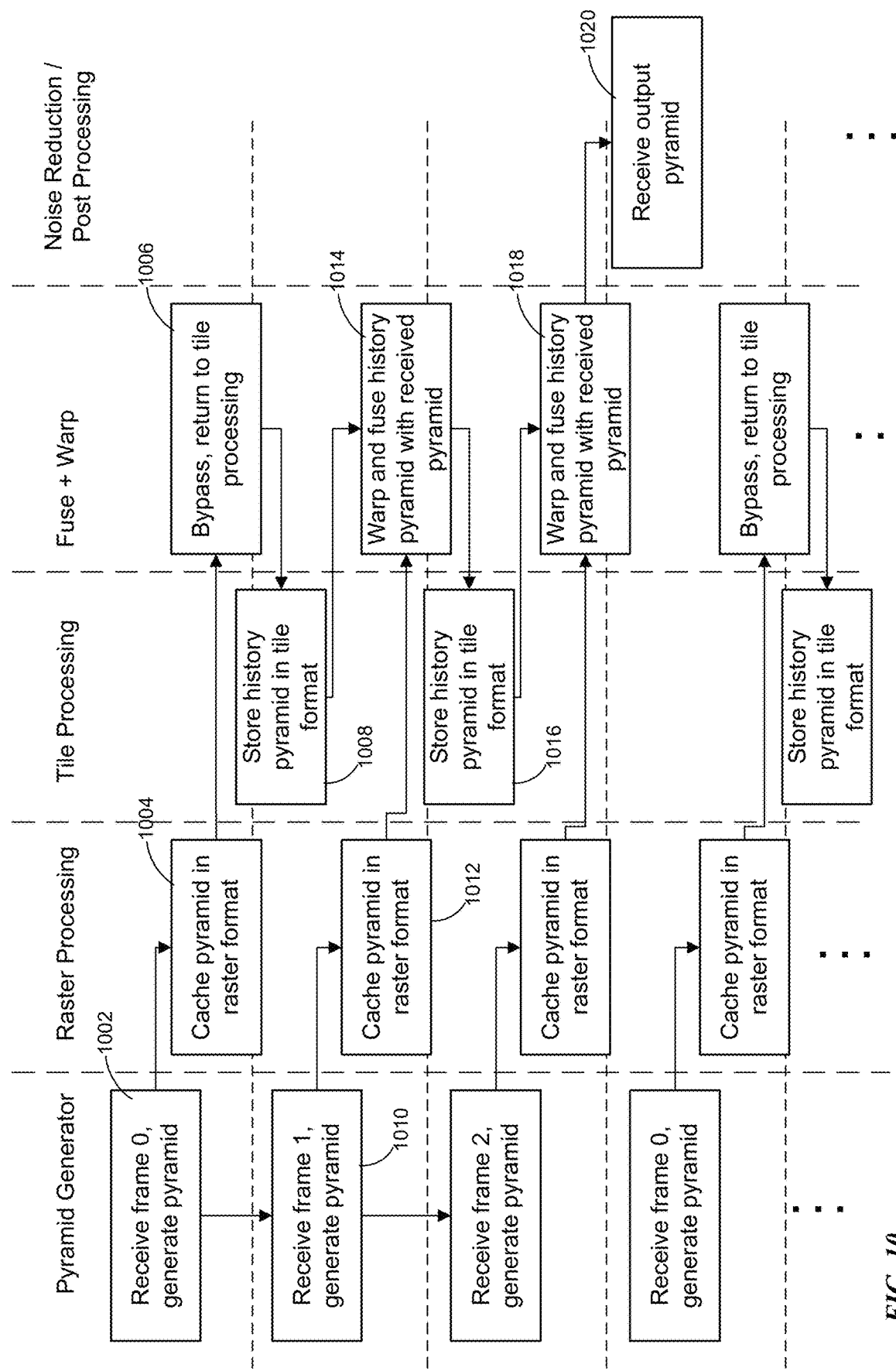
FIG. 10 illustrates a diagram describing an IIR temporal processing application that may be performed by the image fusion circuit, in accordance with some embodiments.

FIG. 10 illustrates a diagram describing an IIR temporal processing application that may be performed by the image fusion circuit 400, in accordance with some embodiments. In IIR, the image fusion circuit 400 receives sets of images, each set comprising a frame 0 to frame n. In the illustrated embodiment, each set of images comprises three images (e.g., frame 0, frame 1, and frame 2), although it is understood that in other embodiments, different numbers of images per set may be used. The image fusion circuit fuses each set of images to form a merged image that is output for spatial processing. As such, the ISP may use this application to output image stills from sets for received images.

As illustrated in FIG. 10, at 1002, the pyramid generator 406 receives a first frame of an image set (i.e., frame 0) and generates a corresponding pyramid. At 1004, the generated pyramid is cached (e.g., in cache 420) in raster format. As the frame 0 is the first image frame received by the image fusion circuit 400 for the current set of images, there is no history frame to be used for fusion, and the generated pyramid corresponding to frame 0 bypasses the fusion module 424 at 906, and is stored in memory (e.g., DRAM 422) in tile format as the history frame at 1008. In some embodiments, because frame 0 is not the last image frame of the set, an image of the generated pyramid is not output to spatial processing.

At 1010, the pyramid generator 406 receives a next image of the set (frame 1) and generates a pyramid. At 1012, the generated pyramid is cached (e.g., in cache 420) in raster format. At 1014, the history pyramid (stored in DRAM 422) is received by the fusion module 424, and warped and fused with the cached pyramid. The resulting pyramid is saved back to memory in tile format as a new history pyramid at 1016. In some embodiments, if the image corresponding to the pyramid fused with the history pyramid is not the last image frame of the set, an image of the generated pyramid is not output to spatial processing.

The process may be repeated for one or more subsequent images of the set. When a condition that the history pyramid is warped and fused with an image pyramid corresponding to the last image of the set (e.g., frame 2) is satisfied at 1018, the resulting fused pyramid is output for spatial processing at 1020. In addition, as there are no additional images in the set, the fused pyramid does not need to be saved in memory for subsequent fusion. Afterwards, the process may begin from the beginning as the image fusion circuit 400 receives a new set of images.

Figure 11:
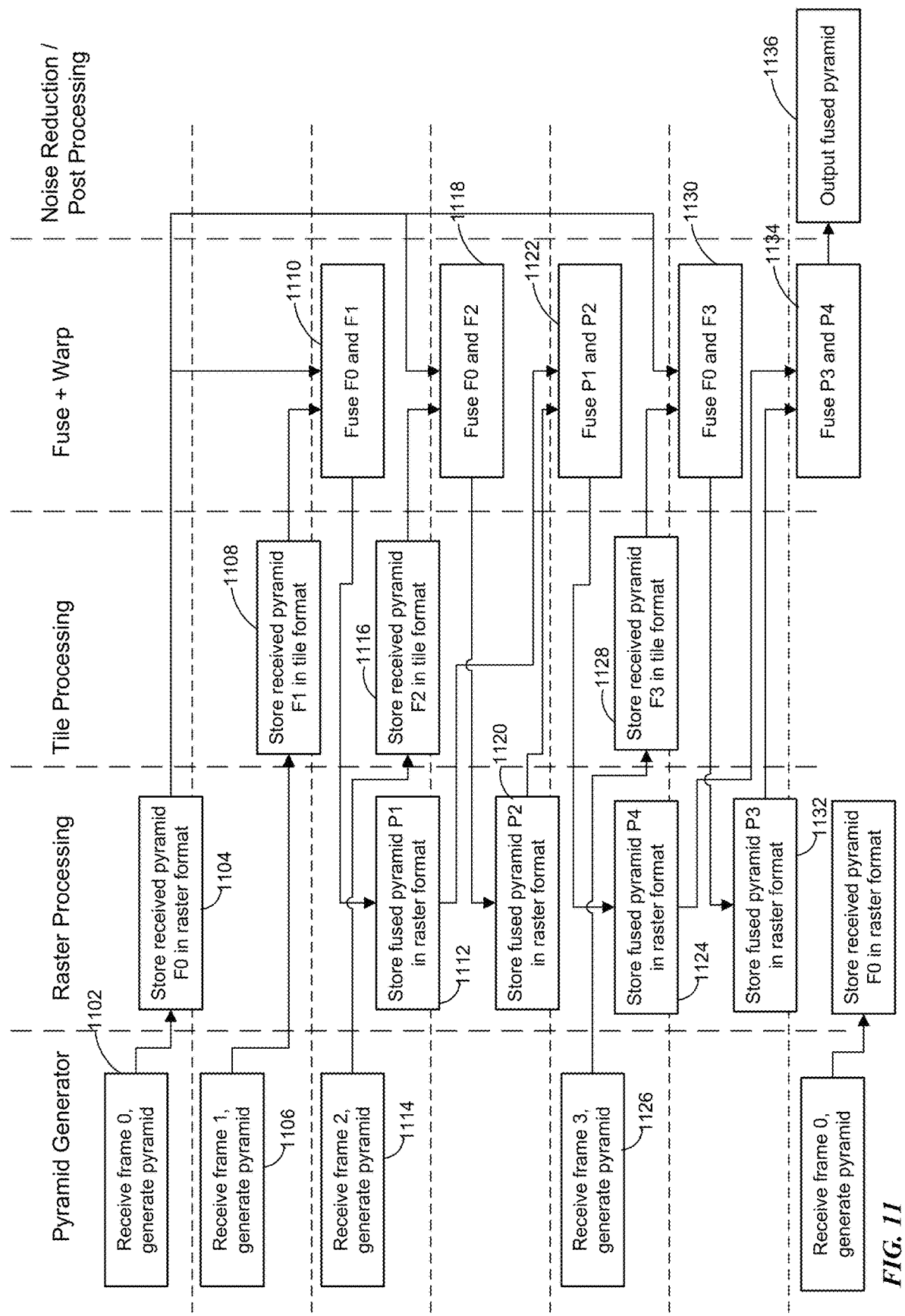
FIG. 11 illustrates a diagram describing an FIR temporal processing application that may be performed by the image fusion circuit, in accordance with some embodiments.

FIG. 11 illustrates a diagram describing an FIR temporal processing application that may be performed by the image fusion circuit 400, in accordance with some embodiments. In the FIR application, a set of images (e.g., frames 0 to n) are fused in n−1 passes to generate n−1 partial fusion results, each corresponding to a fusion of a reference frame of the set (e.g., frame 0) to another image of the set. The partial fusion results are accumulated (over n−2 passes) to final fused image that is output for spatial processing. In the illustrated embodiment, a set of images contains four images (frames 0 to 3). As such, FIR processing of the image set is performed using three passes for partial fusion, and two passes for accumulation. Due to the additional fusion passes when performing FIR, the image fusion circuit 400 may receive images at a slower rate compared to IIR temporal processing. In the FIR configuration mode, the data routing circuit 411 and the fusion module 424 may operate based on various conditions to perform the partial fusions and accumulations in a specific order to achieve a desired result.

Figure 12:
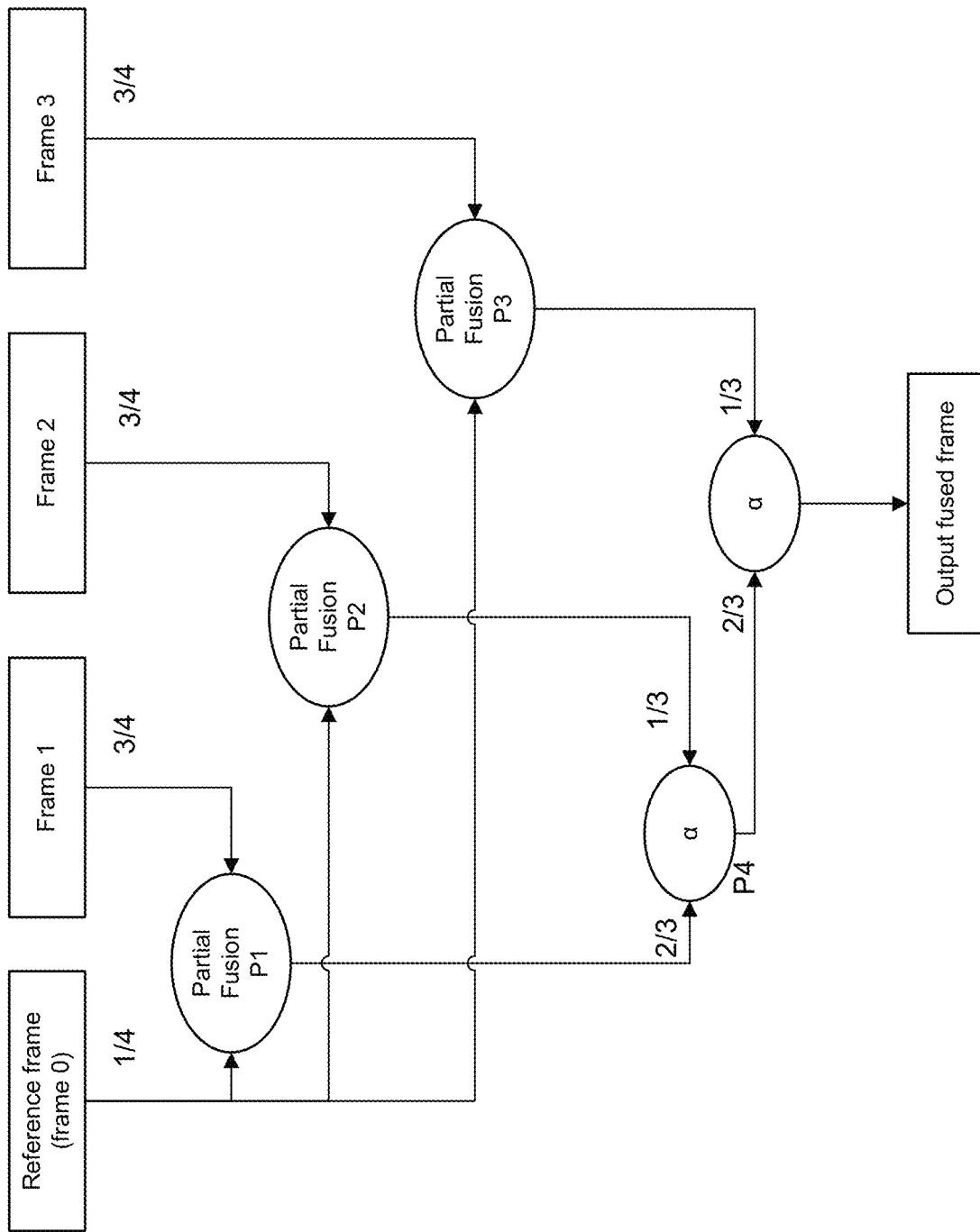
FIG. 12 illustrates the partial fusion and accumulation steps that may be performed for FIR temporal processing, in accordance with some embodiments.

FIG. 12 illustrates the partial fusion and accumulation steps that may be performed for FIR temporal processing, in accordance with some embodiments. In the illustrated example, FIR is to be performed on a set of four images (frames 0 to 3), where the first image (frame 0) is designated as the reference frame. As illustrated in FIG. 12, the reference frame 0 is fused with each of the remaining frames to form n−1 (e.g., 3) partial fusions (e.g., partial fusions P1, P2, and P3). In some embodiments, the images for each partial fusion may be weighted. For example, because the reference frame 0 contributes to each of the partial fusions P1, P2, and P3, while the remaining image frames contribute only to one partial fusion each of P1, P2, and P3, the reference frame 0 may be assigned a lower weight in each partial fusion, in order to balance the contribution of each image to the final fused image. For example, as illustrated in FIG. 12, the reference frame 0 is given a weight of ¼ for partial fusions P1, P2, and P3, while the remaining images (frame 1, frame 2, and frame 3) are each given a weight of ¾ for their respective partial fusions.

The partial fusion results are then accumulated in order to generate a final output fused image frame. For example, as illustrated in FIG. 12, partial fusions P1 and P2 are first fused to form a partial fusion P4, which is then fused with partial fusion P3 to generate the fused output image. In some embodiments, accumulation of the partial fusion results is based upon weights of the partial fusions. For example, partial fusion P1 may be given a weight of ⅔, and partial fusion P2 given a weight of ⅓ when accumulated to form P4, while P4 is given a weight of ⅔ and P3 a weight of ⅓ when accumulated to form the fused output image. In some embodiments, accumulation of partial fusion results may be simplified in comparison to the fusion of the received image to produce the partial fusion P1 through P3. For example, in some embodiments, while normal image fusion to produce the partial fusion results P1 through P3 may be performed with ghost detection (e.g., where the calculator circuit 512 drops a weight value of images to be fused if there is no match for a particular pixel), the accumulation of the partial fusion results may be performed without ghost detection.

As illustrated in FIG. 11, at 1102, the pyramid generator 406 receives frame 0 of a set of images, and generates a pyramid F0. At 1104, pyramid F0 is stored as a reference frame pyramid in raster format. Because the reference frame pyramid may need to be stored for an extended period of time and used to perform multiple fusions, the reference frame pyramid F0 may be stored in the DRAM 422.

At 1106, the pyramid generator receives frame 1 and generates a pyramid F1. At 1108, the pyramid F1 is stored in memory (e.g., DRAM 422) in tile format. In addition, the image registration processor 404 may receive frame 1 and determine a set of warping parameters to align frame 1 with frame 0. At 1110, pyramids F0 and F1 are retrieved from DRAM and fused to generate a partial fusion pyramid P1 (e.g., the fusion module warps the pyramid F1 and fuses the warped pyramid with F0), which is stored in memory (e.g., DRAM 422) in raster format at 1112. As discussed above, the fusion may be performed with different weights for each frame (e.g., weight of ¼ for pyramid F0, and weight of ¾ for pyramid F1).

At 1114, the pyramid generator receives frame 2 and generates a pyramid F2. At 1116, the pyramid F2 is stored in memory (e.g., DRAM 422) in tile format. In addition, the image registration processor 404 may receive frame 2 and determine a set of warping parameters to align frame 2 with frame 0. At 1118, pyramids F0 and F2 are retrieved from DRAM and fused to generate a partial fusion pyramid P2 (e.g., the fusion module warps the pyramid F2 and fuses the warped pyramid with F0), which is stored in memory (e.g., DRAM 422) in raster format at 1120. At 1122, the partial fusion pyramids P1 and P2 are retrieved from DRAM and fused. Because both pyramids F1 and F2 (corresponding to frame 1 and frame 2) were previously warped to align with reference frame 0 and pyramid F0, no additional warping needs to be performed when fusing P1 and P2. The resulting pyramid P4 is stored in memory (e.g., DRAM 422) in raster format at 1124.

At 1126, the pyramid generator receives frame 3 of the image set, and generates a corresponding pyramid F3. At 1128, the pyramid F3 is stored in memory (e.g., DRAM 422) in tile format. In addition, the image registration processor 404 may receive frame 3 and determine a set of warping parameters to align frame 3 with frame 0. At 1130, the fusion module 424 retrieves pyramids F3 and F0, and fuses the pyramids to form partial fusion pyramid P4 (e.g., warping F3 based on the warping parameters and fusing the warped pyramid with F0), which is stored in memory (e.g., DRAM 422) at 1132. At 1134, the partial fusion results P3 and P4 are fused. As pyramid F3 was already warped to align with reference pyramid F0 when producing partial fusion pyramid P4, no additional warping needs to be performed when fusing P3 and P4. The resulting fused pyramid may be output to spatial processing at 1136. The process may be repeated for subsequent sets of images.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An image signal processor, comprising:
 an image fusion engine configured to operate in a plurality of configuration modes, comprising:
  a pyramid generation circuit configured to receive a plurality of images and to generate, for each image, a respective image pyramid comprising a plurality of downscaled images by sequentially downscaling the image;
  a data routing circuit coupled to the pyramid generation circuit configured to receive a plurality of image pyramids from the pyramid generation circuit, and, for each image pyramid of the plurality of image pyramids, route the image pyramid to be stored into a memory where a time until the image pyramid is to be used for image fusion in accordance with a specified configuration mode of the plurality of configuration modes exceeds a length of time, or route the image pyramid to a cache separate from the memory to bypass the memory and is not stored in the memory where a time until the image pyramid is to be used for image fusion in accordance with the specified configuration mode is less than the length of time; and an image fusion circuit coupled to the data routing circuit configured to receive a first image pyramid and a second image pyramid routed from the data routing circuit, fuse the first image pyramid with the second image pyramid to generate a fused image, and route the fused image to the data routing circuit in preparation for further fusion or as an output fused image to a noise processing circuit in accordance with the specified configuration mode; and a controller coupled to the image fusion engine and configured to switch the image fusion engine between the plurality of configuration modes, each configuration mode specifying a sequence of conditions controlling routings between the data routing circuit and the image fusion circuit of image pyramids generated based upon a set of images received by the image fusion circuit over time, to perform a respective temporal processing scheme for fusing the set of images, wherein:

in a first configuration mode, the image fusion engine is configured to fuse an image pyramid of a received image of the set of images with an image pyramid of a history image corresponding to a fusion of a plurality of previously received images of the set of images to generate the output fused image, and in a second configuration mode, the image fusion engine is configured to fuse an image pyramid of a reference image of the set of images received first in time with each remaining image of the set of images to generate a plurality of partial fusions, and to fuse image pyramids of the plurality of partial fusions to generate the output fused image.

2. The image signal processor of claim 1, wherein the image fusion engine further comprises a warping circuit configured to, responsive to receiving an image pyramid corresponding to an image of a plurality of images, generate a warped pyramid by warping each of the plurality of downscaled images according to one or more warping parameters derived from a model describing correspondence between the image and another image.

3. The image signal processor of claim 1, wherein the data routing circuit is configured to, in the first configuration mode:

bypass the memory for each image pyramid of the plurality of image pyramids received from the pyramid generation circuit;

receive, from the image fusion circuit, a fused image pyramid corresponding to a fusion of the plurality of previously received images; and store the received fused image pyramid in the memory as the image pyramid of the history image.

4. The image signal processor of claim 1, wherein the data routing circuit is configured to, in the second configuration mode:

store the image pyramid corresponding to the reference image of the set of images in the memory in a raster format; and store image pyramids corresponding to each of the remaining images of the set of images in the memory in a tile format.

5. The image signal processor of claim 1, wherein, in the first configuration mode, the image fusion engine is configured to output the output fused image responsive to the image pyramid of the history image corresponding to a fusion of a predetermined number of previously received images.

6. The image signal processor of claim 1, wherein, in the second configuration mode, the set of images comprises N images, and the image fusion engine performs N−1 fusion operations to generate N−1 partial fusions, and N−2 fusion operations of the N−1 partial fusions to generate the output fused image.

7. The image signal processor of claim 1, wherein, in the second configuration mode, the image fusion engine is configured to store in the memory up to two image pyramids at a time, and is configured to perform a first fusion of two partial fusions of the plurality of partial fusions before performing a third fusion to generate a third partial fusion of the plurality of partial fusions.

8. A method for image fusion, comprising:

configuring an image fusion engine comprising a pyramid generation circuit, a data routing circuit, and an image fusion circuit to be in a first configuration mode or a second configuration mode of a plurality of configuration modes, each configuration mode specifying a sequence of conditions controlling routings between the data routing circuit and the image fusion circuit of image pyramids generated based upon a set of images received by the image fusion engine over time, to perform a respective temporal processing scheme for fusing the set of images;

generating, at the pyramid generation circuit of the image fusion engine, for each image of the received set of images, a respective image pyramid by sequentially downscaling the image;

at the data routing circuit coupled to the pyramid generation circuit configured to receive the generated image pyramids from the pyramid generation circuit, for each image pyramid of the generated image pyramids, routing the image pyramid to be stored into a memory where a time until the image pyramid is to be used for image fusion in accordance with a specified configuration mode of the plurality of configuration modes exceeds a length of time, or routing the image pyramid to a cache separate from the memory to bypass the memory where a time until the image pyramid is to be used for image fusion in accordance with the specified configuration mode is less than the length of time;

at the image fusion circuit of the image fusion engine coupled to the data routing circuit wherein the image fusion engine is configured to receive a first image pyramid and a second image pyramid routed from the data routing circuit, fuse the first image pyramid with the second image pyramid to generate a fused image, and route the fused image to the data routing circuit in preparation for further fusion or as an output fused image to a noise processing circuit in accordance with the specified configuration mode:

responsive to the image fusion engine being in the first configuration mode, fusing an image pyramid of a received image of the set of images with an image pyramid of a history image corresponding to a fusion of a plurality of previously received images of the set of images to generate the output fused image, responsive to the image fusion engine being in the second configuration mode, fusing an image pyramid of a reference image of the set of images received first in time with each remaining image of the set of images to generate a plurality of partial fusions, and fusing image pyramids of the plurality of partial fusions to generate the output fused image.

9. The method of claim 8, further comprising, responsive to receiving an image pyramid corresponding to an image of the set of images, generating, by a warping circuit of the image fusion engine, a warped pyramid by warping each of the plurality of downscaled images according to one or more warping parameters derived from a model describing correspondence between the image and another image.

10. The method of claim 8, wherein the data routing circuit for each of the generated image pyramids, storing the image pyramid into a memory or bypassing the memory based upon whether the image fusion engine is in the first configuration mode or the second configuration mode.

11. The method of claim 8, further comprising, responsive to the image fusion engine being in the first configuration mode, outputting the output fused image responsive to the image pyramid of the history image corresponding to a fusion of a predetermined number of previously received images.

12. The method of claim 8, wherein the set of images comprises N images, and further comprising, responsive to the image fusion engine being in the second configuration mode, performing N−1 fusion operations to generate N−1 partial fusions, and N−2 fusion operations of the N−1 partial fusions to generate the output fused image.

13. The method of claim 8, further comprising, by the data routing circuit, responsive to the image fusion engine being in the first configuration mode:
bypassing the memory for each the plurality of pyramids received from the pyramid generation circuit;
receiving, from the image fusion circuit, a fused image pyramid corresponding to the fusion of the plurality of previously received images; and
storing the received fused image pyramid in the memory as an image pyramid of the history image.

14. The method of claim 8, further comprising, by the data routing circuit, responsive to the image fusion engine being in the second configuration mode:
storing the image pyramid corresponding to the reference image of the set of images in the memory in raster format; and
storing image pyramids corresponding to each of the remaining images of the set of images in the memory in tile format.

15. An electronic device, comprising:
a memory;
an image signal processor comprising:
an image fusion engine configured to operate in a plurality of configuration modes, comprising:
a pyramid generation circuit configured to receive a plurality of images and to generate, for each image, a respective image pyramid comprising a plurality of downscaled images by sequentially downscaling the image;
a data routing circuit coupled to the pyramid generation circuit configured to receive a plurality of image pyramids from the pyramid generation circuit, and, for each image pyramid of the plurality of image pyramids, route the image pyramid to be stored into a memory where a time until the image pyramid is to be used for image fusion in accordance with a specified configuration mode of the plurality of configuration modes exceeds a length of time, or route the image pyramid to a cache separate from the memory to bypass the memory and is not stored in the memory where a time until the image pyramid is to be used for image fusion in accordance with the specified configuration mode is less than the length of time; and
an image fusion circuit coupled to the data routing circuit configured to receive a first image pyramid and a second image pyramid routed from the data routing circuit, fuse the first image pyramid with the second image pyramid to generate a fused image, and route the fused image to the data routing circuit in preparation for further fusion or as an output fused image to a noise processing circuit in accordance with the specified configuration mode; and
a controller coupled to the image fusion engine and configured to switch the image fusion engine between the plurality of configuration modes, each configuration mode specifying a sequence of conditions controlling routings between the data routing circuit and image fusion circuit of image pyramids generated based upon a set of images received by the image fusion engine over time, to perform a respective temporal processing scheme for fusing the set of images, wherein:
in a first configuration mode, the image fusion engine is configured to fuse an image pyramid of a received image of the set of images with an image pyramid of a history image corresponding to a fusion of a plurality of previously received images of the set of images to generate the output fused image, and wherein
in a second configuration mode, the image fusion engine is configured to fuse an image pyramid of a reference image of the set of images received first in time with each remaining image of the set of images to generate a plurality of partial fusions, and to fuse image pyramids of the plurality of partial fusions to generate the output fused image.

16. The electronic device of claim 15, wherein the data routing circuit is configured to:
in the first configuration mode:
bypass the memory for each image pyramid of the plurality of image pyramids received from the pyramid generation circuit;
receive, from the image fusion circuit, a fused image pyramid corresponding to the fusion of the plurality of previously received images; and
store the received fused image pyramid in the memory as an image pyramid of the history image; and
in the second configuration mode:
store the image pyramid corresponding to the reference image of the set of received images in the memory in a raster format; and
store image pyramids corresponding to each of the remaining images of the set of received images in the memory in a tile format.

* * * * *

UNITED STATES PATENT AND TRADEMARK OFFICE
CERTIFICATE OF CORRECTION

PATENT NO. : 11,803,949 B2
APPLICATION NO. : 16/987210
DATED : October 31, 2023
INVENTOR(S) : Smirnov et al.

It is certified that error appears in the above-identified patent and that said Letters Patent is hereby corrected as shown below:

In the Specification

In Column 3, Line 33, delete "(FIG." and insert -- (FIG.) --, therefor.

In Column 11, Line 3, delete "mage" and insert -- image --, therefor.

In Column 26, Line 7, delete "Unsealed" and insert -- Unscaled --, therefor.

In Column 26, Line 23, delete "unsealed" and insert -- unscaled --, therefor.

In Column 26, Line 27, delete "Unsealed" and insert -- Unscaled --, therefor.

In Column 26, Line 32, delete "unsealed" and insert -- unscaled --, therefor.

In Column 26, Line 35, delete "unsealed" and insert -- unscaled --, therefor.

In Column 26, Line 43, delete "unsealed" and insert -- unscaled --, therefor.

In the Claims

In Column 33, Claim 3, Line 61, delete "a" and insert -- the --, therefor.

In Column 35, Claim 9, Line 15, delete "the" and insert -- a --, therefor.

In Column 35, Claim 10, Line 19, delete "each" and insert -- each image pyramid --, therefor.

In Column 35, Claim 13, Line 38, delete "the plurality of" and insert -- image pyramid of a plurality of image --, therefor.

In Column 35, Claim 13, Line 44, delete "an" and insert -- the --, therefor.

Signed and Sealed this
Twelfth Day of December, 2023

Katherine Kelly Vidal
*Director of the United States Patent and Trademark Office*

CERTIFICATE OF CORRECTION (continued)
U.S. Pat. No. 11,803,949 B2

In Column 36, Claim 15, Line 29, delete "and" and insert -- and the --, therefor.

In Column 36, Claim 16, Line 58, delete "an" and insert -- the --, therefor.